US012459149B2

(12) United States Patent
Yamada

(10) Patent No.: US 12,459,149 B2
(45) Date of Patent: Nov. 4, 2025

(54) APPARATUS FOR PROCESSING SHEETS

(71) Applicant: DUPLO SEIKO CORPORATION, Kinokawa (JP)

(72) Inventor: Kenta Yamada, Kinokawa (JP)

(73) Assignee: DUPLO SEIKO CORPORATION, Kinokawa (JP)

( * ) Notice: Subject to any disclaimer, the term of this patent is extended or adjusted under 35 U.S.C. 154(b) by 153 days.

(21) Appl. No.: 18/240,839

(22) Filed: Aug. 31, 2023

(65) Prior Publication Data

US 2024/0076158 A1 Mar. 7, 2024

(30) Foreign Application Priority Data

Sep. 2, 2022 (JP) ................................ 2022-140306

(51) Int. Cl.
*B26D 7/18* (2006.01)
*B26D 1/24* (2006.01)
(Continued)

(52) U.S. Cl.
CPC .............. *B26D 7/18* (2013.01); *B26D 1/245* (2013.01); *B26D 5/00* (2013.01); *B26D 5/06* (2013.01); *B26D 5/20* (2013.01); *B26D 5/32* (2013.01); *B26D 5/34* (2013.01); *B26D 7/2635* (2013.01); *B26D 9/00* (2013.01); *B26D 11/00* (2013.01); *B31B 50/006* (2017.08); *B65H 7/20* (2013.01); *B65H 35/02* (2013.01); *B65H 75/02* (2013.01); *B26D 5/007* (2013.01); *B26D 2007/0018* (2013.01); *B31B 50/14* (2017.08); *B31B 50/25* (2017.08); *B31F 1/08* (2013.01);
(Continued)

(58) Field of Classification Search
CPC .......... B31B 50/14; B26D 5/00; B26D 1/015; B26D 1/035; B26D 1/141; B26D 1/1435; B26D 1/151; B26D 1/185; B26D 1/225; B26D 1/245; B26D 1/265; B26D 1/285; B65H 35/02; B65H 35/0086
See application file for complete search history.

(56) References Cited

U.S. PATENT DOCUMENTS

2013/0057930 A1 3/2013 Toki et al.
2020/0333761 A1* 10/2020 Yamada .................... B26F 1/20

FOREIGN PATENT DOCUMENTS

EP 3733364 A1 11/2020
JP 2020175463 A 10/2020

OTHER PUBLICATIONS

The extended European Search Report issued on Feb. 5, 2024, by the European Patent Office in corresponding European Application No. 23194955.3. (7 pages).

* cited by examiner

*Primary Examiner* — Jeremy R Severson
(74) *Attorney, Agent, or Firm* — BUCHANAN INGERSOLL & ROONEY PC

(57) ABSTRACT

A apparatus for processing sheets includes: a conveyance unit conveying a sheet; a processing unit provided with processing members processing the sheet along a conveyance direction, and a moving unit moving the processing members in a width direction; and a controller. When a processing position in the width direction to be processed by the processing members is different between a sheet conveyed ahead by the conveyance unit and a subsequent sheet, the controller processes the subsequent sheet by using a processing member having a minimum movement distance from the processing position of the sheet conveyed ahead among the processing members.

7 Claims, 20 Drawing Sheets

(51) Int. Cl.

| | |
|---|---|
| ***B26D 5/00*** | (2006.01) |
| ***B26D 5/06*** | (2006.01) |
| ***B26D 5/20*** | (2006.01) |
| ***B26D 5/32*** | (2006.01) |
| ***B26D 5/34*** | (2006.01) |
| ***B26D 7/26*** | (2006.01) |
| ***B26D 9/00*** | (2006.01) |
| ***B26D 11/00*** | (2006.01) |
| ***B31B 50/00*** | (2017.01) |
| ***B65H 7/20*** | (2006.01) |
| ***B65H 35/02*** | (2006.01) |
| ***B65H 75/02*** | (2006.01) |
| *B26D 7/00* | (2006.01) |
| *B31B 50/14* | (2017.01) |
| *B31B 50/25* | (2017.01) |
| *B31F 1/08* | (2006.01) |

(52) U.S. Cl.

CPC .............. *B65H 2301/41487* (2013.01); *B65H 2551/10* (2013.01); *B65H 2553/41* (2013.01); *B65H 2701/1311* (2013.01); *B65H 2701/1315* (2013.01)

APPARATUS FOR PROCESSING SHEETS

TECHNICAL FIELD

The present disclosure relates to an apparatus for processing sheets.

BACKGROUND ART

An apparatus for processing sheets that sequentially conveys a plurality of sheets stacked on a placing table to a downstream side and processes the sheets is known. JP 2020-175463 A discloses that a processing tool keeps a state in which a sheet can be processed in a margin portion of the sheet.

However, in the apparatus described in JP 2020-175463 A, when a processing position at which a sheet to be conveyed ahead is processed along a conveyance direction is different from a processing position of a subsequent sheet, it takes a certain time for the processing tool to move in a width direction intersecting the conveyance direction of the sheet.

SUMMARY

An object of the present disclosure is to provide an apparatus for processing sheets capable of shorten a time required for processing sheets in a case where a processing position is different between a sheet to be conveyed ahead and a subsequent sheet when the sheets are processed along a conveyance direction.

An apparatus for processing sheets according to an aspect of the present disclosure includes: a conveyance unit that conveys a sheet; a processing unit provided with a plurality of processing members that process the sheet along a conveyance direction of the conveyance unit, and a moving unit that moves the processing members in a width direction intersecting the conveyance direction; and a controller configured to operate the conveyance unit, the processing unit and the moving unit, wherein when a processing position of a sheet conveyed ahead by the conveyance unit in the width direction to be processed by the processing members is different from the processing position of a subsequent sheet, the controller controls the processing unit and the moving unit to process the subsequent sheet by using a processing member having a minimum movement distance from the processing position of the sheet conveyed ahead among the plurality of processing members.

According to the present disclosure there can be provided the apparatus for processing sheets capable of shorten a time required fix processing sheets in a case where a processing position is different between a sheet to be conveyed ahead and a subsequent sheet when the sheets are processed along a conveyance direction.

DETAILED DESCRIPTION

Figure 1:
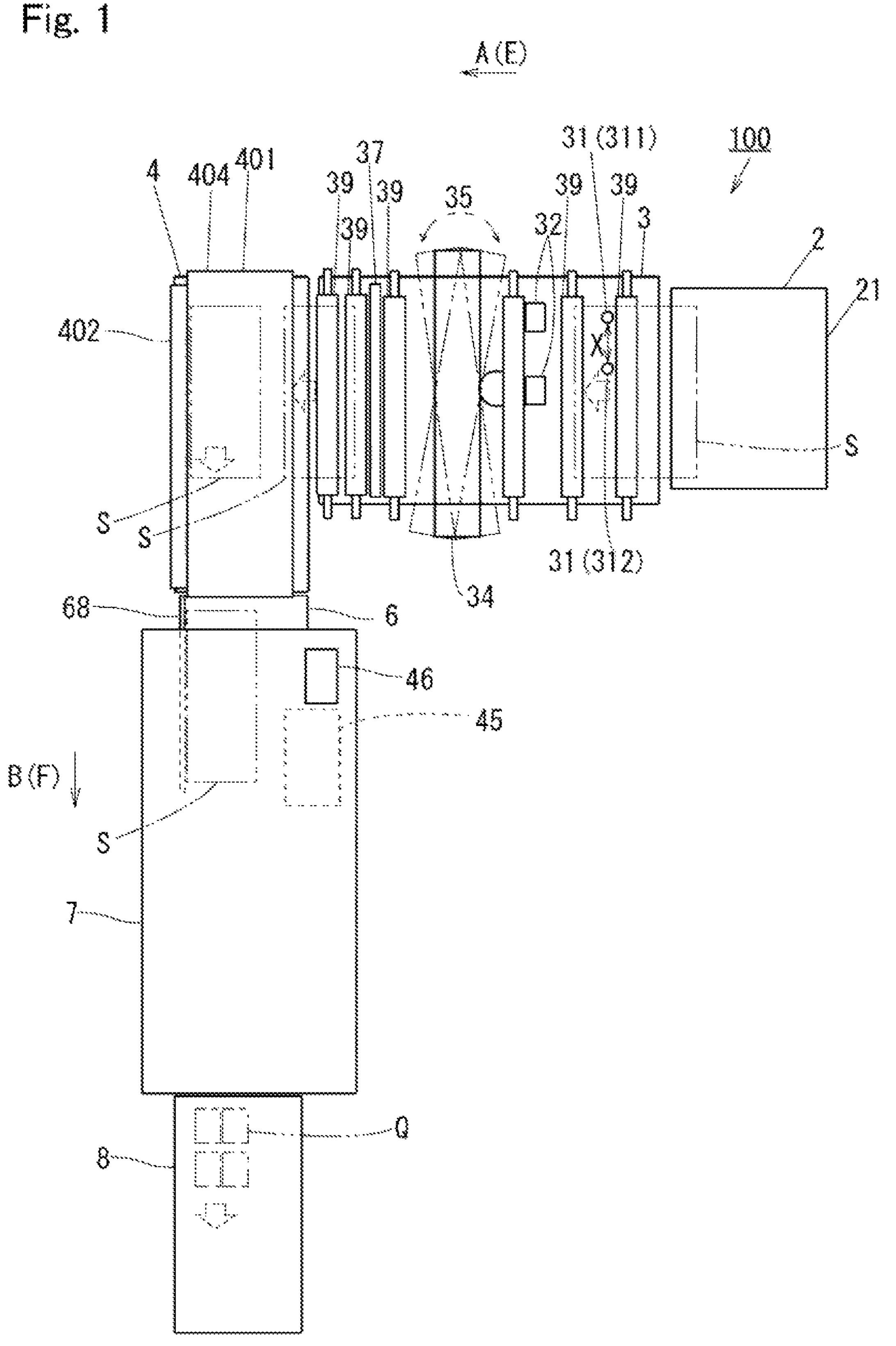
FIG. 1 is a plan view illustrating a schematic configuration of an apparatus for processing sheets according to an embodiment of the present disclosure.

An apparatus for processing sheets according to the first aspect of the present disclosure includes: a conveyance unit that conveys a sheet; a processing unit provided with a plurality of processing members that process the sheet along a conveyance direction of the conveyance unit, and a moving unit that moves the processing members in a width direction intersecting the conveyance direction; and a controller configured to operate the conveyance unit, the processing unit and the moving unit, wherein when a processing position of a sheet conveyed ahead by the conveyance unit in the width direction to be processed by the processing members is different from the processing position of a subsequent sheet, the controller controls the processing unit and the moving unit to process the subsequent sheet by using a processing member having a minimum movement distance from the processing position of the sheet conveyed ahead among the plurality of processing members.

According to the present disclosure, when a processing position in the width direction to be processed by the processing members is different between a sheet conveyed ahead by the conveyance unit and a subsequent sheet, the controller processes the subsequent sheet by using a processing member having a minimum movement distance from the processing position of the sheet conveyed ahead among the plurality of processing members. Thus, the time required for processing sheets in a case where a processing position is different between the sheet conveyed ahead and the subsequent sheet can be shortened when the sheets are processed along a conveyance direction.

The apparatus for processing sheets according to the second aspect of the present disclosure, in the apparatus of the first aspect, wherein when the processing position of a sheet conveyed further behind the subsequent sheet is within a predetermined range from the processing position of the sheet conveyed ahead, the controller executes a standby control of controlling the processing unit and the moving unit to process the subsequent sheet while causing a processing member to wait within the predetermined range from a position where the sheet conveyed ahead has been processed.

The time required for processing sheets can be further shortened when the controller executes a standby control of processing the subsequent sheet while causing a processing member among the plurality of processing members with which the processing position in the width direction of a sheet conveyed further behind the subsequent sheet is within a predetermined range from the processing position of the sheet conveyed ahead to wait within the predetermined range from a position where the processing has been performed on the sheet conveyed ahead.

The apparatus for processing sheets according to the third aspect of the present disclosure, in the apparatus of the second aspect, wherein when the processing position of the sheet conveyed ahead is within a predetermined value from a position of a side end edge of the subsequent sheet in a conveyance path, the controller executes an avoidance control of controlling the processing unit and the moving unit to cause the processing member positioned within the predetermined value from the side end edge of the subsequent sheet to move from a standby position within the predetermined range from the processing position of the sheet conveyed ahead to an avoidance position moved by a predetermined amount in a direction away from the subsequent sheet before processing the subsequent sheet.

Then, when the processing position of the sheet conveyed ahead is within a predetermined value from a position of a side end edge of the subsequent sheet in a conveyance path, and the controller executes an avoidance control of causing the processing member positioned within a predetermined value from the side end edge of the subsequent sheet to move to an avoidance position in a direction away from the subsequent sheet by a predetermined amount from a standby position for waiting within the predetermined range from the processing position of the sheet conveyed ahead and to process the subsequent sheet, it is possible to avoid cutting waste having a narrow width from remaining in the conveyance path to cause paper jam.

The apparatus for processing sheets according to the fourth aspect of the present disclosure, in the apparatus of the first or second aspect, wherein when the processing position of the sheet conveyed ahead is different from the processing position of the subsequent sheet, and the processing position of the sheet further behind the subsequent sheet is within a predetermined range from the processing position of the sheet conveyed ahead, the controller is operable to execute a movement control of causing the processing member, which has processed the sheet conveyed ahead, to move to the processing position of the subsequent sheet and process the subsequent sheet, and determines whether to execute the standby control or the movement control based on an instruction of a user.

Further, the time required for processing sheets can be further shortened when the processing position of the sheet conveyed ahead is different from the processing position of the subsequent sheet, and the processing position of the sheet further behind the subsequent sheet is within a predetermined range from the processing position of the sheet conveyed ahead, the controller is capable of executing a movement control of causing the processing member, which has processed the sheet conveyed ahead, to move to the processing position of the subsequent sheet and process the subsequent sheet, and determines whether to execute the standby control or the movement control based on an instruction of a user.

The apparatus for processing sheets according to the fifth aspect of the present disclosure, in the apparatus of the first aspect, includes: a conveyance unit that conveys a sheet; a slitter unit provided with a slitter that cuts the sheet along a conveyance direction of the conveyance unit and a slitter moving unit that moves the slitter in a width direction intersecting the conveyance direction; and a controller that controls an operation of the slitter moving unit, wherein a guide that removes cutting waste generated by cutting the sheet by the slitter from a conveyance path and a guide moving unit that moves the guide in the width direction are provided, and the controller controls the guide moving unit to remove cutting waste generated at a side end of the sheet, the waste being generated by cutting the sheet with the slitter, from the conveyance path by the guide.

The apparatus for processing sheets according to the sixth aspect of the present disclosure, in the apparatus of the first or fifth aspect, comprising a cutting device that cuts the sheet along the conveyance direction on an upstream side of the processing unit.

Further, in a case where a cutting device that cuts the sheet along the conveyance direction is provided on an upstream side of the processing unit is provided, the time required for processing sheets can be further shortened when the sheet is cut by the cutting device on the upstream side such that the processing position in the width direction processed by the processing member is different between the sheet conveyed ahead by the conveyance unit and the subsequent sheet.

First Embodiment

An apparatus for processing sheets according to the present disclosure will be described with reference to the drawings. FIG. 1 is a plan view illustrating an overall configuration of an apparatus for processing sheets 100 according to a first embodiment of the present disclosure. The apparatus for processing sheets 100 includes a supply device 2, a cutting device 3, a cross conveyor device 4, a processing device 7, and a stacker device 8 as main processing mechanisms. The apparatus for processing sheets 100 also includes a conveyance unit 18 that conveys a sheet S and a controller 45 that controls entire operations of the apparatus for processing sheets 100. A conveyance direction E with the conveyance unit 18 of the cutting device 3 and a conveyance direction F with the conveyance unit 18 of the processing device 7 are orthogonal to each other. The cutting device 3 conveys the sheet S along the first direction A from right to left in FIG. 1. The processing device 7 conveys the sheet S after cutting along the second direction B from the top to the bottom in FIG. 1.

In recent years, the size of the maximum printable sheet S in a general-purpose printing machine tends to increase, and a size exceeding B3 is also printable in many cases.

The present apparatus for processing sheets 100 cuts the sheet S after printing having a large size equal to or larger than a certain size into a predetermined size by the upstream cutting device 3, further performs cutting processing with the downstream processing device 7, removes a margin of the sheet S, and processes the sheet S so as to leave only a printed portion.

The cutting device 3 can also cut a size exceeding B2 size, for example. On the other hand, the size of the sheet S that can be processed by the processing device 7 is B3 size at the maximum. The cutting device 3 cuts the sheet S to a size smaller than the B3 size acceptable to the processing device 7, and delivers the sheet S to the processing device 7.

Supply Device 2

The supply device 2 includes an air suction belt-type air sheet feeding unit (not illustrated), an elevator-type sheet feeding tray 21 that ascends and descends according to a stacking amount of the sheets S, and a pair of conveyance rollers (not illustrated) that further convey the sheet S fed by the air sheet feeding unit to the downstream side in the first direction A. In the present embodiment, the sheet S having a size exceeding the B2 size can also be fed.

When the sheet S is conveyed by the pair of conveyance rollers and a leading end of the sheet S reaches a leading end sensor 31 of the cutting device 3 to be described below, the pressing of the pair of conveyance rollers in the supply device 2 is released, and the sheet S is conveyed only by a conveyance roller 39 in the cutting device 3 to be described below.

Cutting Device 3

The cutting device 3 includes the leading end sensor 31 that detects that the leading end of the sheet S conveyed from the supply device 2 has reached, a laser sensor 32 that detects a position of the leading end of the sheet S and a registration mark provided on the sheet S in advance and detects an inclination angle of printing with respect to the conveyance direction of the sheet S, a plurality of conveyance rollers 39, and a motor (not illustrated) that drives the plurality of conveyance rollers 39. The leading end sensor 31 and the laser sensor 32 are disposed at two positions in a second direction B perpendicular to the first direction A.

The leading end sensor 31 includes the first sensor 311 and the second sensor 312. The first sensor 311 and the second sensor 312 are provided at the same position in the first direction A in the cutting device 3. The first sensor 311 and the second sensor 312 are provided at positions separated by a predetermined distance X in the second direction B.

The leading end sensor 31 detects that the sheet S being conveyed is skewed when a deviation of a predetermined value or more occurs in the timing at which the leading end of the sheet S is detected by each of the first sensor 311 and the second sensor 312.

The cutting device 3 further includes an angle adjuster 35 capable of adjusting the angle of a movable blade unit 34 to be perpendicular to a print image based on the inclination angle of the print image detected by the laser sensor 32. The angle adjuster 35 can adjust the angle of the movable blade unit 34 during conveyance of the sheet S. After the sheet S is stopped at a preset cutting position, the movable blade unit 34 cuts the sheet S by moving a cutting blade (a pair of upper and lower rotary blades) in a direction orthogonal to a direction in which the sheet S is conveyed. The sheet S after cutting is discharged to a cross conveyor device 4 by a pair of conveyance rollers 39.

The cutting device 3 includes a rotation guide 37 that retracts a conveyance guide on a conveyance path 5 to a rejection position and can reject an unnecessary cutting waste J when the unnecessary cutting waste 1 that has been cut by the movable blade unit 34 and passed through the cutting position of the sheet S has a length equal to or larger than a predetermined length.

Cross Conveyor Device 4

The cross conveyor device 4 receives the sheet S cut by the cutting device 3 and conveyed in the first direction A, conveys the sheet S in the second direction B orthogonal to the first direction A, and sends the sheet S to the processing device 7.

The cross conveyor device 4 is disposed at a subsequent stage of the cutting device 3 and includes an oblique conveyance device 404 that receives the sheet S discharged from the cutting device 3 on an endless belt 401 having a predetermined width and conveys the sheet S in the second direction B while conveying the sheet S obliquely toward a guide wall 402 so that an edge of the received sheet S comes along the guide wall 402.

Processing Device 7

Figure 2:
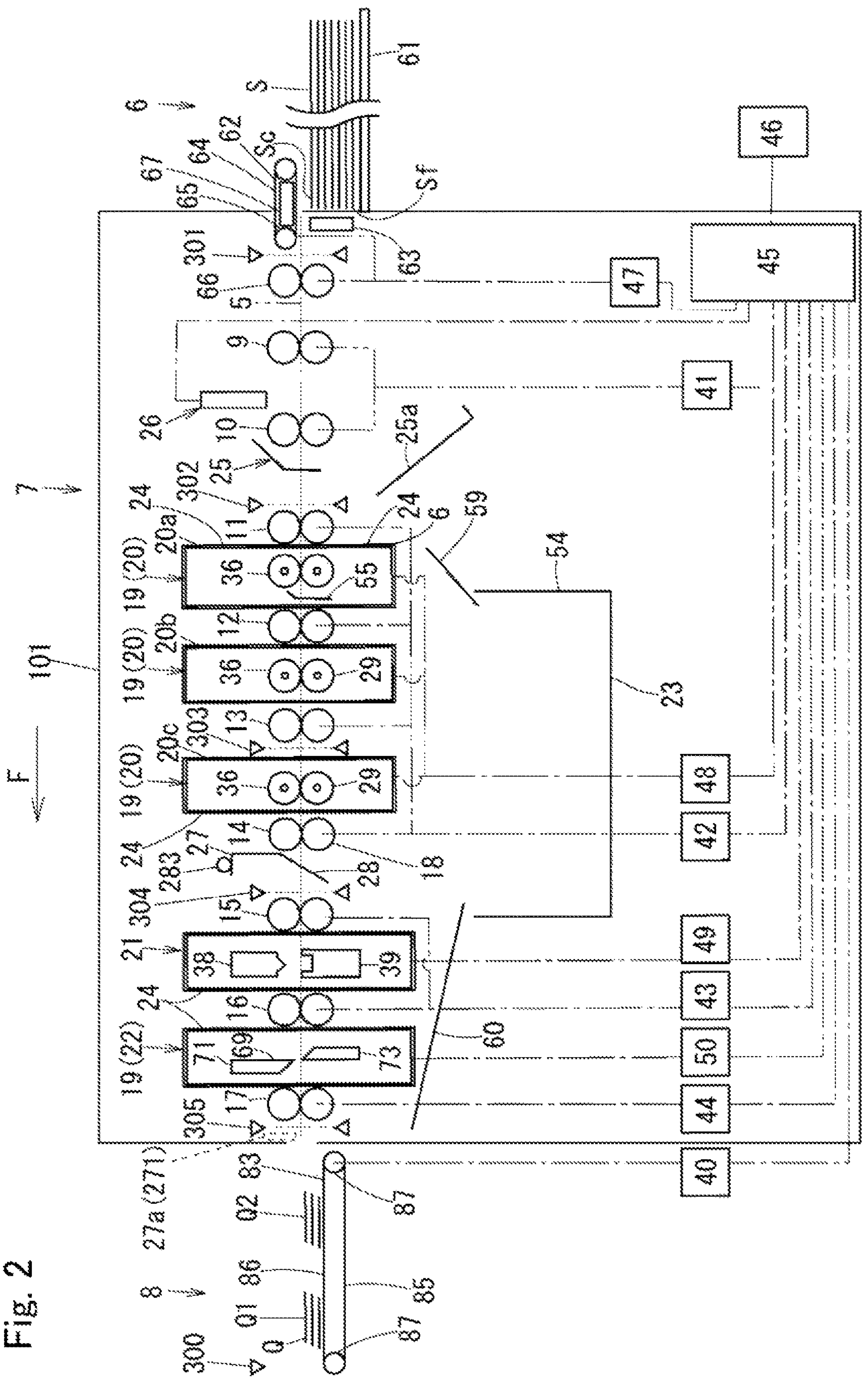
FIG. 2 is a longitudinal sectional view of a processing device of the apparatus for processing sheets.

FIG. 2 is a schematic and longitudinal sectional view of the processing device 7 and the stacker device 8. In FIG. 2, the processing device 7 includes an insertion unit 6 at an upstream end of an apparatus body 101 in the conveyance direction F of the sheet S.

The insertion unit 6 includes a supply table 61, a guide plate 68, a supply roller 66, a suction conveyance unit 62, and a separation blower 63. The supply table 61 is provided to load the sheet S and supply the sheet S to the conveyance path 5. The supply table 61 can be lifted and lowered by a lifting unit (not illustrated). When the sheet S is supplied, the lifting unit lifts the supply table 61 from a standby position to a supply position at a predetermined height at which the uppermost sheet S is sucked and conveyed by the suction conveyance unit 62 and can be supplied to the conveyance path 5. Thus, the supply table 61 is movable between the standby position and the supply position.

The guide plate 68 is in contact with a side end edge SL of the sheet S and guides the sheet S to cause the sheet S to be conveyed to the downstream side without skewing. A pair of upper and lower supply rollers 66 are provided. The suction conveyance unit 62 includes a suction fan 67, a conveyance belt 64, and a belt roller 65. In the insertion unit 6, a predetermined number of sheets S stacked on the supply table 61 are supplied to the conveyance path 5 one by one in order from the top using the suction conveyance unit 62 and the pair of upper and lower supply rollers 66.

The separation blower 63 blows air toward a front end edge Sf of the sheet S on the supply table 61 by a fan (not illustrated), separates the uppermost sheet S from the plurality of stacked sheets S, causes the suction conveyance unit 62 to suck the uppermost sheet S, and conveys the uppermost sheet S. One of the belt rollers 65 and the lower supply 661 among the supply rollers 66 are connected to a sheet feeding drive unit 47. The separation blower 63, the suction fan 67, and the sheet feeding drive unit 47 are electrically connected to the controller 45.

A substantially horizontal conveyance path 5 is formed inside the processing device 7. The conveyance path 5 includes a conveyance unit 18 in which a plurality of upper and lower pairs of conveyance rollers 9 to 17 are installed. The conveyance rollers 9 to 17 are disposed at intervals in the conveyance direction F. Each of the conveyance rollers 9 to 17 constituting the conveyance unit 18 is coupled to a corresponding one of conveyance drive units 41 to 44 via a power transmission mechanism (not illustrated), and each of the conveyance drive units 41 to 44 is electrically connected to the controller 45.

The conveyance path 5 is further provided with a plurality of light transmissive detection units 301 to 305 for detecting the front end edge (downstream side end edge) Sf or a rear end (upstream side end edge) Sr of the sheet S or a workpiece Q, and each of the detection units is electrically connected to an interface of the controller 45. The first detection unit 301 on the most upstream side in the conveyance direction F of the sheet S is disposed between the suction conveyance unit 62 of the insertion unit 6 and the supply roller 66, the next second detection unit 302 is disposed in the vicinity of the upstream side of the slitter unit 20, the next third detection unit 303 is disposed in the middle of the slitter unit 20, the next fourth detection unit 304 is disposed in the vicinity of the upstream side of a crease unit 21, and the fifth detection unit 305 on the most downstream side is disposed in the vicinity of the upstream side of the stacker device 8.

The first detection unit 301 detects the front end edge Sf of the sheet S before the sheet S sucked and conveyed by the suction conveyance unit 62 of the insertion unit 6 is gripped by the supply roller 66, or the rear end edge Sr of the sheet S gripped and conveyed by the supply roller 66. The first detection unit 301 is used to calculate the position of the sheet S conveyed thereafter on the conveyance path 5 based on the position of the detected sheet S.

The second detection unit 302 and the third detection unit 303 detect clogging of the sheet S in the middle of processing. The fourth detection unit 304 is installed supplementarily to correct the sheet position information obtained by the first detection unit 301 to make the sheet position information more accurate in preparation for a case where the conveyance path 5 becomes long and positional deviation (conveyance error) in the conveyance direction F of the sheet S in the middle of processing on the conveyance path 5 is accumulated. The fifth detection unit 305 detects discharge of the workpiece Q to the stacker device 8. The fifth detection unit 305 detects a jam or the like of the workpiece Q in the stacker device 8.

A reading unit 26 and a rejection mechanism 25 are provided on the downstream side of the insertion unit 6 as necessary. The reading unit 26 reads an image of the position mark printed on the sheet S and detects a processing reference position in the conveyance direction F of the processing device 7 of the sheet S and in the width direction W orthogonal to the conveyance direction F. In addition, the reading unit 26 reads an image of a barcode printed at a predetermined position of the sheet S and acquires various processing information to be applied to the sheet S. The reading unit 26 includes a CCD sensor or the like.

When a position mark or a barcode printed on the sheet S is unclear and thus cannot be read by the reading unit 26, the rejection mechanism 25 operates with respect to the sheet S to drop the unreadable sheet S and collect the sheet S on the tray 25*a*.

Further, a processing unit 24 for processing the sheet S to be conveyed is installed in the conveyance path 5. The processing unit 24 includes a processing member 29. The processing member 29 processes the sheet S along the conveyance direction F of the conveyance unit 18 or the width direction W intersecting the conveyance direction. When the processing member 29 processes the sheet S along the conveyance direction F of the conveyance unit 18, the processing unit 24 includes a moving unit 51. The moving unit 51 moves the processing member 29 in the width direction W intersecting the conveyance direction F.

In FIG. 2, a cut unit 19 and the crease unit 21 are provided as the processing unit 24. The cut unit 19 includes three slitter units 20 and a cutter unit 22. The crease unit 21 forms a fold in the sheet S. In the figure, a case where the slitter unit 20 processes the sheet S along the conveyance direction F of the conveyance unit 18 is illustrated. The figure also illustrates a case where the cutter unit 22 and the crease unit 21 processes the sheet S along the width direction W intersecting the conveyance direction F.

The slitter unit 20, the crease unit 21, and the cutter unit 22 are each configured as detachable units 20*a* to 20*c*. Each of the units 20*a* to 20*c* has a structure that can be attached to and detached from a desired position in an apparatus body 101 with a cassette system. Thus, it is possible to change the disposition order of the slitter unit 20, the crease unit 21, and the cutter unit 22 according to the type of processing, or to replace or add another processing unit 24 such as a mechanism for performing crease processing along the conveyance direction F instead of the width direction W, a chamfering mechanism, or a perforation forming mechanism.

The slitter unit 20 includes three units of a first unit 20*a*, a second unit 20*b*, and a third unit 20*c* in this order from the upstream side in the conveyance direction F. In each of the units 20*a* to 20*c*, two pairs of slitters 36, each pair being formed of upper and lower rotary cutting blades, are disposed at intervals in the width direction W. The slitter 36 is installed so as to be movable in the width direction W intersecting the conveyance direction F of the conveyance unit 18 of the processing device 7 with the moving unit 51. The slitter 36 constitutes the processing member 29 that processes the sheet S along the second direction B that is the conveyance direction F of the conveyance unit 18 of the processing device 7. One rotary blade on the upper side or the lower side of the conveyance path 5 is rotated by the driving force of a rotation drive unit 48 as a processing member drive unit that drives the processing member 29, and the other rotary blade is driven to rotate following the rotation of the one rotary blade, and thus, cutting is performed along the conveyance direction F by the conveyance unit 18 to form a cutting line D on the sheet S.

In the first unit 20*a* on the most upstream side, a guide 55 is installed on the downstream side of the slitter 36. The guide 55 removes the cutting waste J generated by cutting the sheet S with the slitter 36 from the conveyance path 5. In the first unit 20*a* on the most upstream side, unnecessary cutting waste Ja (see FIG. 6) at both left and right end edges of the sheet S is mainly cut. The guide 55 removes the cutting waste Ja at the left and right end edges cut by the slitter 36 from the conveyance path 5, and guides and drops the cutting waste Ja toward a cutting waste collecting unit 23.

Figure 3:
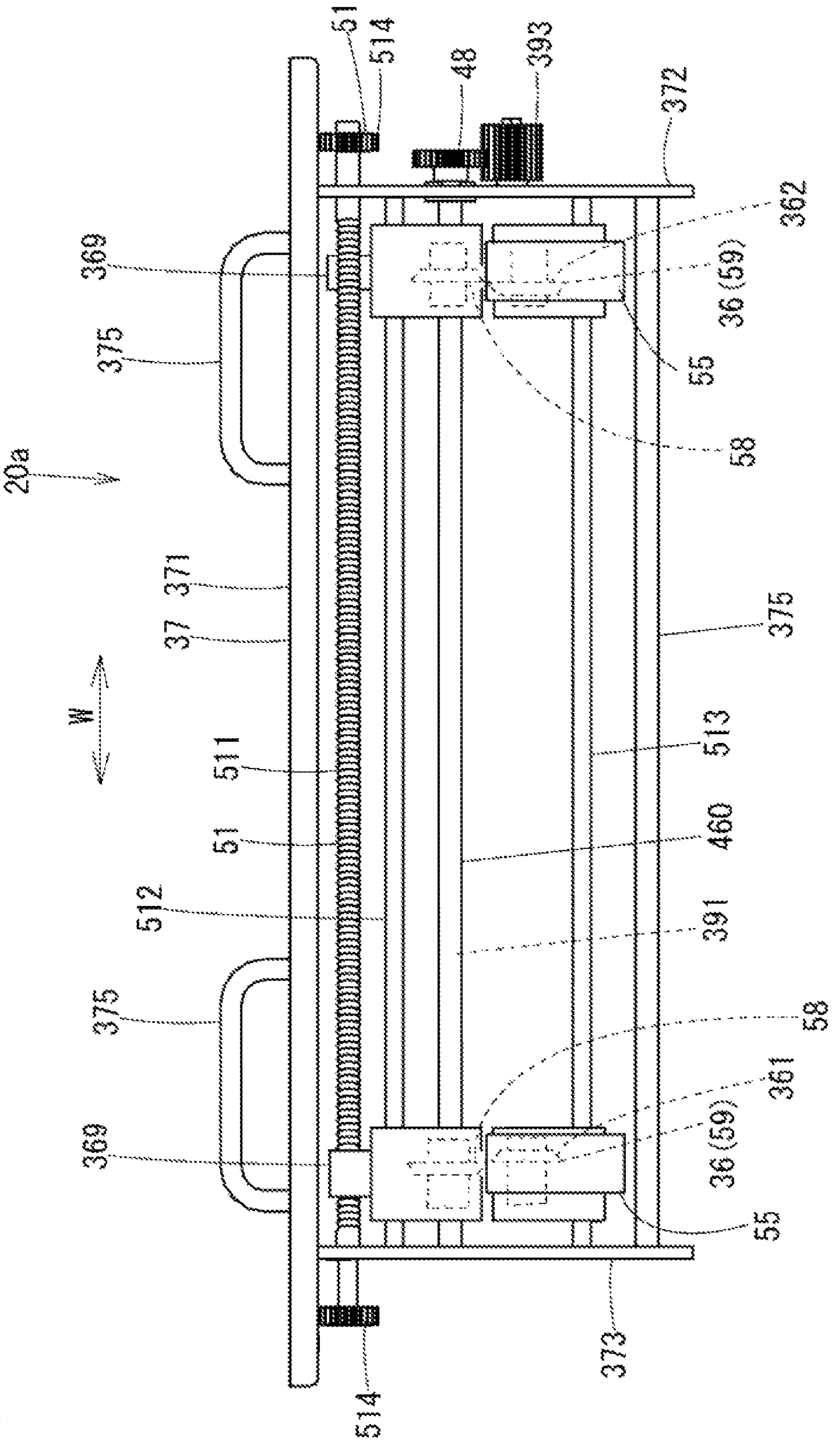
FIG. 3 is a view of a slitter unit of the processing device as viewed from a downstream side.

FIG. 3 is a view of the unit 20*a* on the most upstream side of the slitter unit 20 as viewed from the downstream side in the conveyance direction F. The unit 20*a* on the most upstream side includes a frame body 37, the slitter 36, the rotation drive unit 48, and a moving unit 51. The frame body 37 includes a top plate 371, a pair of left and right side plates 372 and 373, and a bottom plate 375. Two handles 375 are attached to the upper surface of the top plate 371. The side plates 372 and 373 are suspended vertically downward from positions near both sides of the top plate 371.

A pair of right and left slitters 36 are provided, and they are movable in the width direction W in the frame body 37 with the moving unit 51. A slitter 361 includes a drive blade 58 and a driven blade 59 that are disposed vertically opposite to each other. The slitter 36 cuts the sheet S by rubbing the drive blade 58 and the driven blade 59.

In FIG. 2, the rotation drive unit 48 includes one drive shaft 460, a power transmission mechanism 393 such as a gear and a belt, and a rotation drive source (not illustrated) such as a motor. The drive shaft 460 is bridged over the left and right side plates 372 and 373 and is inserted through the rotation centers of the left and right drive blades 58. The power transmission mechanism 393 is provided outside the side plate 372 illustrated on the right side in FIG. 2. The rotary drive source is installed in the apparatus body 101. When the unit 20*a* is attached to the apparatus body 101, the driving force of the rotary drive source is transmitted to the power transmission mechanism 393 to rotate the drive shaft 460 and simultaneously rotate both the right and left drive blades 58.

The moving unit 51 moves the slitter 36 as the processing member 29 between the processing position, the reference position, and a position outside the conveyance path 5. The moving unit 51 includes two screw shafts 511, one upper guide shaft 512, one lower guide shaft 513, a pair of left and right gears 514, and cutting blade movement drive units (not illustrated) as two processing member movement drive units (not illustrated). All of the four shafts of the screw shafts 511, the upper guide shaft 512, and the lower guide shaft 513 are bridged between the left and right side plates 372 and 373. The two screw shafts 511 are provided side by side on the upstream side and the downstream side in the conveyance direction F of the sheet S.

A screw unit 369 of the left slitter 362 in FIG. 3 is screwed into the screw shaft 511 on the upstream side. The upstream screw shaft 511 is provided with a gear 514 at an end protruding outward from the left side plate 373. A screw unit 369 of the slitter 361 on the light side in FIG. 2 is screwed into the downstream screw shaft 511. The downstream screw shaft 511 is provided with a gear 514 at an end protruding outward from the right side plate 372. A processing member movement drive unit such as a motor is installed in the apparatus body 101. When the unit 20 is attached to a receiving unit 6 of the apparatus body 101, the left and right gears 514 are connected to the two processing member movement drive units of the apparatus body 101, respectively. Then, the two screw shafts 511 are independently rotated by a predetermined amount via the gears 514 by driving of the processing member movement drive units, and the slitters 361 and 362 are moved to processing positions for performing processing on the sheet S.

A cutting waste dropping mechanism 27 is disposed on the downstream side of the slitter unit 20. The cutting waste dropping mechanism 27 includes a pair of left and right guides 28. A cutting waste Jb of the sheet S cut along the conveyance direction F and becoming unnecessary, the cutting waste being generated by cutting the sheet S along the conveyance direction F of the conveyance unit 18 with the unit 20*b* at the center in the conveyance direction F and the unit 20*c* on the most downstream side among the first to third units 20*a* to 20*c* of the slitter unit 20, is removed from the conveyance path 5 by the guide 28.

The guide 28 is movable in the width direction W with a guide moving unit 283. Instead of the guide moving unit 283, the guide 28 may be configured to move along with the movement of the slitter 36 of the unit 20*c* on the most downstream side in the width direction W, for example. When the sheet S passes through the cutting waste dropping mechanism 27, the guide 28 guides and drops the cutting waste Jb toward the cutting waste collecting unit 23.

The crease unit 21 includes a lower mold 39 having an upper end recess and an upper mold 38 having a lower end protrusion fitted to the recess, and the upper mold 38 is connected to a crease drive unit 49 such as a motor via a power transmission mechanism. That is, by causing the upper mold 38 to descend with the driving force of the folding mold drive unit 49, a fold line is formed in the width direction W orthogonal to the conveyance direction F with respect to the sheet S.

The cutter unit 22 includes a pair of cutting blades 69 extending in the width direction W and facing each other. One cutting blade 69 is formed of an upper movable blade 71, and the other cutting blade 69 is formed of a lower fixed blade 73. The upper movable blade 71 comes into contact with and separates from the lower fixed blade 73, and cuts the sheet S in a width direction W orthogonal to the conveyance direction F. The upper movable blade 71 is connected to a cutting drive unit 50 such as a motor via a power transmission mechanism.

The cutting waste collecting unit 23 includes a housing box 54 and guides 59 and 60. The housing box 54 is formed in a rectangular parallelepiped shape having an upper opening. The housing box 54 collects and houses the cutting waste J that has been cut by the cut unit 19 and becomes unnecessary. The guides 59 and 60 guide the cutting waste J cut at the cut unit 19 and falling to the housing box 54.

Stacker Device 8

The stacker device 8 is provided at the downstream end of the processing device 7 in the conveyance direction F The stacker device 8 loads the workpiece Q obtained by the processing in the processing unit 24. The stacker device 8 is provided with a placement unit 83 on which the workpiece Q can be divided and placed at different positions on the placement surface. The placement unit 83 is provided with a belt conveyor 86 for loading the workpiece Q on a belt 85 that is circling. On the belt conveyor 86, the workpiece Q discharged by the conveyance unit 18 is placed while being conveyed.

The belt conveyor 86 includes the endless belt 85, a conveyor roller 87, and a conveyor drive unit 40. The conveyor roller 87 is installed to be separated by a predetermined amount in a discharge direction of the workpiece Q, which is the same direction as the conveyance direction F of the sheet S, in which the belt 85 is stretched. The length of the belt 85 in the width direction W is substantially the same as or a predetermined length slightly longer than the length of the conveyance path 5 in the width direction W on which the sheet S is conveyed, and a plurality of workpieces Q discharged in parallel in the width direction W can be placed on the belt 85. The conveyor drive unit 40 is electrically connected to the controller 45, and the controller 45 controls the drive amount of the conveyor drive unit 40, whereby the belt conveyor 86 is adjusted to travel at a predetermined speed.

The stacker device 8 further includes a full level detection unit 300 that detects a full level of the workpiece Q. The full level detection unit 300 includes an optical sensor or the like and detects that the workpiece Q on the placement unit 83 exceeds the allowable loading amount.

A conveyor stacker may be coupled to the discharge side of the processing device 7. The conveyor stacker is a device in which the cut unit discharged from the processing device 7 is slowly conveyed by a belt conveyor, and the unit is stacked in a state of being obliquely standing on a stacker provided at an end thereof. A sorting guide for sorting and aligning the cut units is provided on the conveyance path 5 of the belt conveyor for the units.

Controller 45

The controller 45 incorporates a CPU and memories such as a RAM and a ROM. The controller 45 controls the operation of the entire apparatus for processing sheets 100. The controller 45 acquires information from the leading end sensor 31, the laser sensor 32, and the detection units 301 to 305, controls driving of the supply device 2, the cutting device 3, the cross conveyor device 4, the processing device 7, the stacker device 8, and the conveyance unit 18 based on processing information of the sheet S set by an operation panel 46 or the reading unit 26, and performs processing of the sheet S.

The operation panel 46 and the reading unit 26 are electrically connected to an interface of the controller 45. The operation panel 46 is configured to serve as both a setting unit for setting various processing information including information related to cutting processing of the sheet S and a display unit. The reading unit 26 constitutes the setting unit.

Further, the controller 45 controls the operation of the moving unit 51 of the processing unit 24. When the processing position in the width direction W processed by the processing member. 29 is different between the sheet S conveyed ahead by the conveyance unit 18 and the subsequent sheet S, the controller 45 processes the subsequent sheet S by using the processing member 29 whose moving distance from the processing position of the preceding conveyed sheet S is the minimum.

The controller 45 can execute a standby control of processing the subsequent sheet S while causing the processing member 29 with which the processing position in the width direction W of the sheet S conveyed further behind the subsequent sheet S is within a predetermined range from the processing position of the sheet S conveyed ahead to wait within the predetermined range from the position where the processing has been performed on the sheet S conveyed ahead. Further, when the processing position of the sheet S conveyed ahead is within a predetermined value from the position of a side end edge of the subsequent sheet S in the conveyance path 5, the controller 45 can execute an avoidance control of causing the processing member 29 positioned within a predetermined value from the side end edge of the subsequent sheet S to move to an avoidance position in a direction away from the subsequent sheet S by a predetermined amount from a standby position for waiting within the predetermined range from the processing position of the sheet S conveyed ahead and to process the subsequent sheet S.

When the processing position of the sheet S conveyed ahead is different from the processing position of the subsequent sheet S, and the processing position of the sheet S further behind the subsequent sheet S is within a predetermined range from the processing position of the sheet S conveyed ahead, the controller 45 can execute a movement control of causing the processing member 29, which has processed the sheet S conveyed ahead, to move to the processing position of the subsequent sheet S and process the subsequent sheet S, and can perform control to determine whether to execute the standby control or the movement control based on an instruction of a user.

Further, the controller 45 can control the guide moving unit 283 to remove the cutting waste Ja generated at a side end of the sheet S, the waste being generated by cutting the sheet S by the slitter 36, from the conveyance path 5 by the guide 28.

Workpiece Arrangement Pattern of Sheet S

Figure 4:
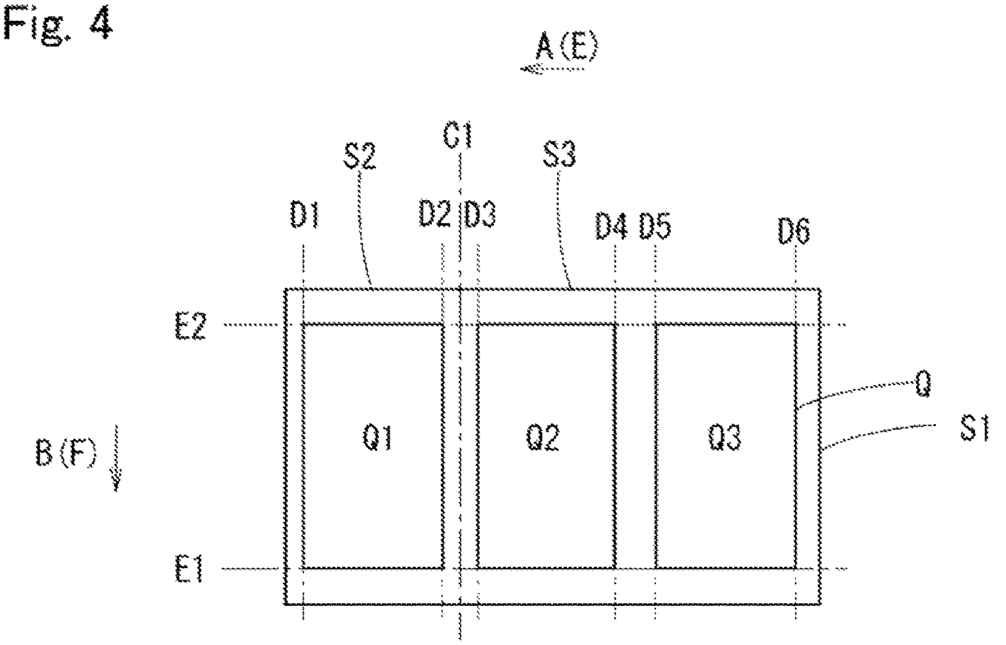
FIG. 4 is a plan view illustrating a sheet to be processed by the apparatus for processing sheets.

FIG. 4 is a plan view illustrating an example of an arrangement pattern of the workpieces Q of the sheet S. As the arrangement pattern of the workpieces Q illustrated in the figure, three workpieces Q1 to Q3 without creases are produced from one sheet S1. The sizes and shapes of the three workpieces Q1 to Q3 may be the same or different. When the shapes and sizes of the workpieces Q1 to Q3 are the same or substantially the same, a plurality of processing positions formed along the conveyance direction F of sheets S2 and S3 alternately conveyed back and force are often within a predetermined range.

First, the sheet S1 conveyed in the first direction A is cut at a position C1 of ⅓ in the first direction A that is the longitudinal direction of the sheet S1 from the leading edge Sf of the sheet S1 in the first direction A along the second direction B orthogonal to the first direction A.

The sheet S1 is cut into two sheets of sheets S2 and S3. The conveyance direction of the sheets S2 and S3 is changed to the second direction B by the cross conveyor device 4, and the sheets S2 and S3 are conveyed one by one to the processing device 7 in this order.

Next, the sheet S2 conveyed in the second direction B is cut along the conveyance direction F along two cutting lines D1 and D2 parallel to the second direction B which is the conveyance direction F of the conveyance unit 18 of the processing device 7. Then, cutting is sequentially performed along the width direction W orthogonal to the conveyance direction F along cutting lines E1 and E2. Thereafter, the sheet S3 is conveyed in the conveyance direction F. The sheet S3 is cut along the conveyance direction F at four cutting lines D3 to D6 parallel to the conveyance direction F. Then, cutting is sequentially performed along the width direction W orthogonal to the conveyance direction F at the cutting lines E3 and E4.

When a plurality of sheets S1 are continuously processed, the sheets S2 and S3 are alternately and continuously conveyed to the processing device 7. That is, for example, after the sheet S3 is conveyed ahead, the sheet S2 is conveyed subsequently. Further, the sheet S3 is conveyed further behind the sheet S2.

Figure 5:
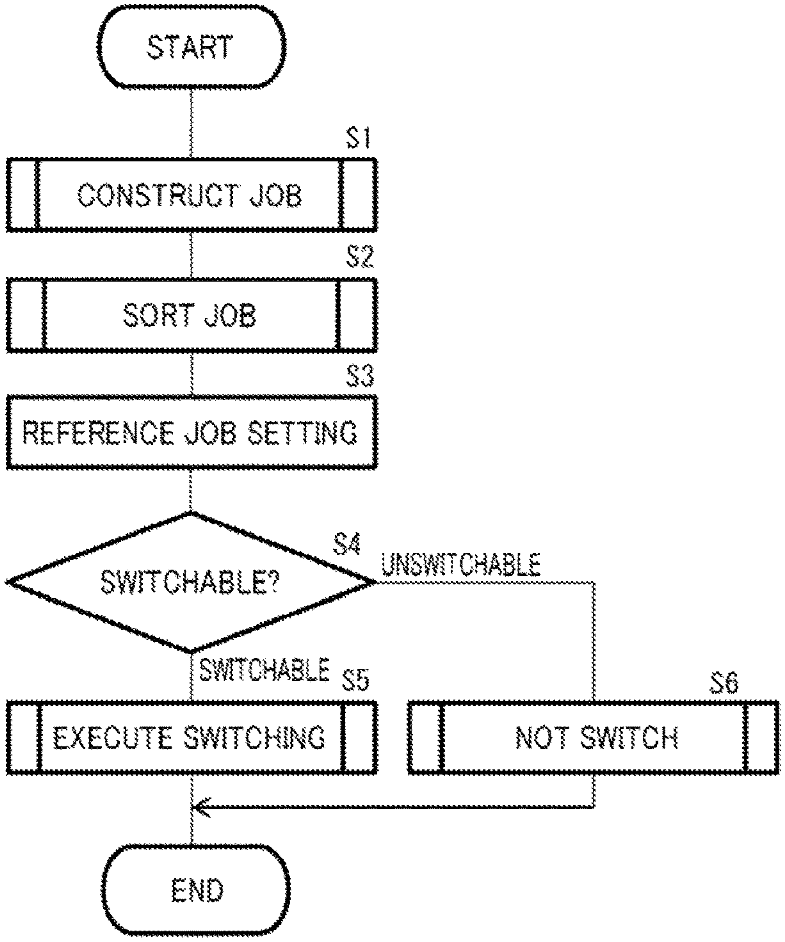
FIG. 5 is a control flow of the apparatus for processing sheets.

FIG. 5 illustrates a flow of the controller 45. In the processing illustrated in FIG. 4, when the sheets S2 and S3 are alternately processed along the conveyance direction F of the conveyance unit 18 of the processing device 7, the controller 45 determines which processing member 29 to move and where to move in the width direction W by controlling the moving unit 51 to process the sheet S. In the first embodiment, a pair of left and right slitters 36 as the processing members 29 are arranged in three rows in the conveyance direction F. Thus, the controller 45 determines which slitter 36 to install out of the six slitters 36 and where to install the slitter 36 in the width direction W.

In Step 1 of FIG. 5, a job related to the disposition of the processing member 29 on the conveyance path 5 is constructed based on the arrangement pattern of the workpiece Q on the sheet S1. In the processing of the sheet S1 illustrated in FIG. 4, two cutting lines D1 and D2 are set for the sheet S2 to be conveyed ahead. Four cutting lines D3 to D6 are set on the subsequent sheet S3. The controller 45 generates two types of Jobs A and B in which cutting positions of the slitter 36 as a processing position in the width direction W using the slitter 36 as the processing member 29 are different between the sheet S2 conveyed ahead by the conveyance unit 18 and the subsequent sheet S3.

Figure 6:
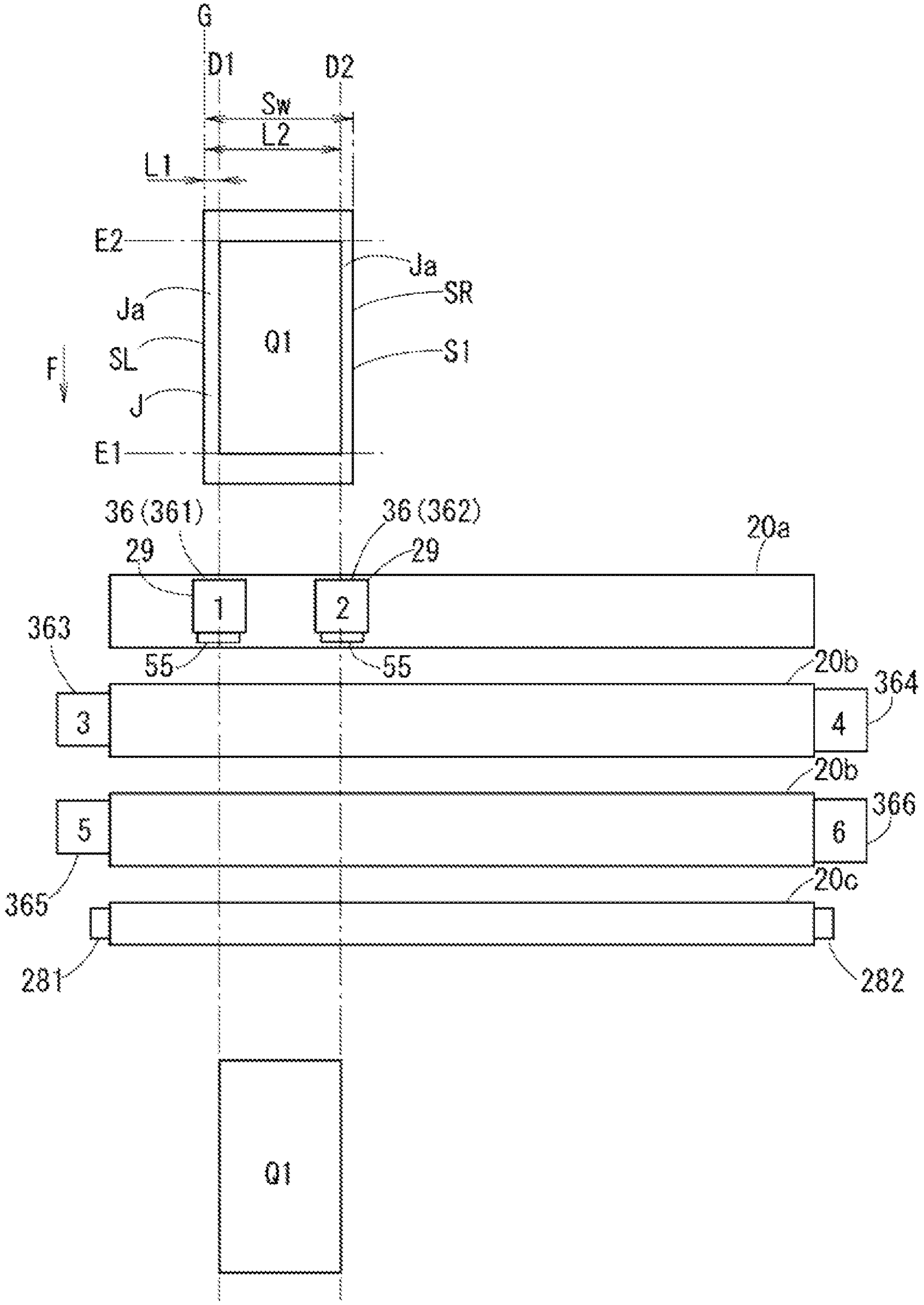
FIG. 6 is a view for explaining disposition of a processing member of the apparatus for processing sheets.

FIG. 6 is a diagram for explaining a disposition of the slitter 36 as the processing member 29 in Job A. Job A is processing along the conveyance direction F of the sheet S2. Two cutting lines D1 and D2 along the conveyance direction F of the processing device 7 are set on the sheet S2. As illustrated in FIG. 6, to process the sheet S2, a pair of left and right slitters 361 and 362 of the first unit 20*a* are used as the processing member 29.

The distance of the cutting line D1 from a reference line G is L1. The reference line G is a line serving as a reference for determining the position of the processing member 29 in the width direction W. Although the reference line G can be freely set, for example, the reference line G can be set at the same position in the width direction W in the conveyance path 5 inside the processing device 7 as the guide wall 402 and the guide plate 68 of the cross conveyor device 4. This is the position of the left side end edge SL of the sheet S when the sheet S is conveyed by the conveyance unit 18 in the processing device 7. The left slitter 361 of the first unit 20*a* in FIG. 6 is moved by the moving unit 51 to a position where the length from the reference line G is L1 when processing the sheet S2. In Job A, the slitter 361 forms the cutting line D1 whose length from the side end edge SL of the sheet S2 is L1.

The distance of the cutting line D2 from a reference line G is L2. The right slitter 362 of the first unit 20*a* in FIG. 6 is moved by the moving unit 51 to a position where the length from the reference line G is L2. In Job A, the slitter 362 forms the cutting line D2 at a position in which the length from the left side end edge SL of the sheet S2 is L2.

Since the slitters 361 and 362 of the first unit 20*a* are used in Job A, the cutting waste J generated by the cutting is removed from the conveyance path 5 by the guide 55 installed on a side of the slitter 36 and moving in the width direction W together with the slitter 36. In Job A, the slitters 363 to 366 of the second unit 20*b* and the third unit 20*c* and the guide 28 of the cutting waste dropping mechanism 27 on the downstream side are moved to positions outside the conveyance path 5 by the moving unit 51 and the guide moving unit 283, respectively, and are on standby.

Figure 7:
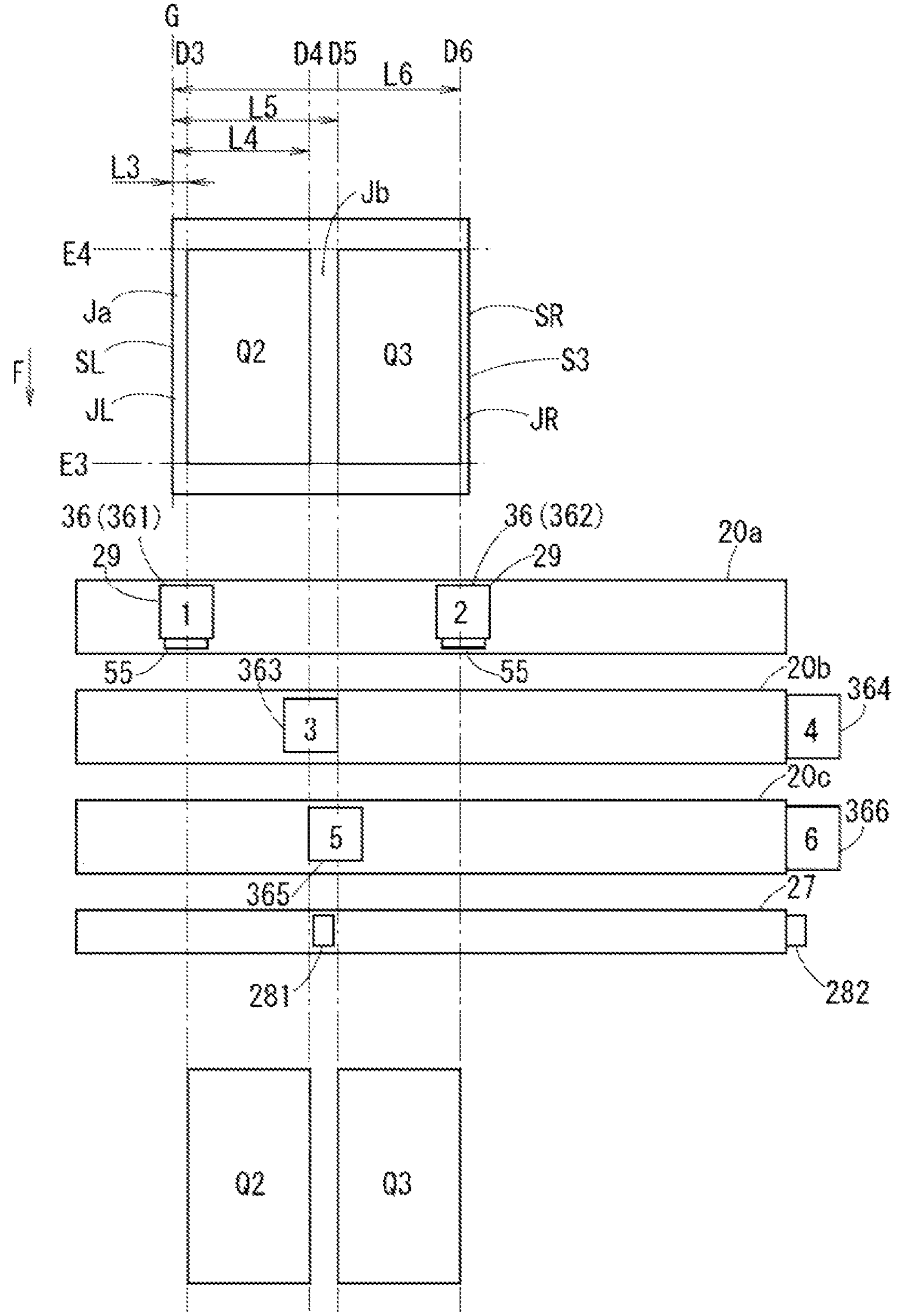
FIG. 7 is a view for explaining disposition of a processing member of the apparatus for processing sheets.

FIG. 7 is a diagram for explaining a disposition of the slitter 36 as the processing member 29 in Job B. Job B is processing along the conveyance direction F of the sheet S3. Four cutting lines D3 to D6 are set on the sheet S3 along the conveyance direction F. To process the sheet S3, the pair of left and right slitters 361 and 362 of the first unit 20*a*, the left slitter 363 of the second unit 20*b*, and the left slitter 365 of the third unit 20*c* are used.

The cutting waste JL generated at the left side end edge SL of the sheet S2 and the cutting waste JR generated at the right side end edge SR of the sheet S3 are both removed from the conveyance path 5 by the guide 55 provided in the slitter 36 of the first unit 20*a*. Thus, the cutting lines D1, D2, D3, and D6 set in the vicinity of the left and right side end edges SL and SR of both the sheet S2 and the sheet S3 are formed by using the slitters 361 and 362 of the first unit 20*a*.

The left slitter 361 of the first unit 20*a* in FIGS. 6 and 7 is moved by the moving unit 51 from the reference line G, which is the formation position of the cutting lines D1 and D3, to the positions of L1 and L3 in Jobs A and B, respectively. Then, the right slitter 362 of the first unit 20*a* in FIGS. 6 and 7 is moved by the moving unit 51 from the reference line G, which is the formation position of the cutting lines D2 and D6, to the positions L2 and L6 in Jobs A and B.

The left slitter 363 of the second unit 20*b* in FIG. 7 and the left slitter 36 of the third unit 20*c* form the cutting lines D4 and D5 in the middle of the sheet S3. The left slitter 363 of the second unit 20*b* in FIG. 7 is moved by the moving unit 51 from the reference line G, which is the position where the cutting line D4 is formed, to the position of L4. The left slitter 365 of the third unit 20*c* is moved by the moving unit 51 from the reference line G, which is the position where the cutting line D5 is formed, to the position of L5.

The left guide 281 of the cutting waste dropping mechanism 27 is moved from the reference line G to a position between L3 and L4 by the guide moving unit 283. The guide 281 guides the cutting waste Jb between the workpieces Q2 and Q3 downward in the conveyance path 5 and removes the cutting waste Jb from the conveyance path 5.

The right slitters 364 and 366 of the second unit 20*b* and the third unit 20*c* not used in Job B and the right guide 282 of the cutting waste dropping mechanism 27 are moved to positions outside the conveyance path 5 by the moving unit 51 and the guide moving unit 283, respectively.

In Step 2 of FIG. 5, the constructed Jobs A and B are sorted in descending order by the number of necessary processing members 29. The number of slitters 36 used in Job A is 2. The number of slitters 36 used in Job B is 4. In this case, when Job A and Job B are sorted in descending order, the first job is Job B, and the second job is Job A.

Job B determined as having the largest number of slitters 36 required in Step 3 is set as a reference job. This reference Job B is defined as Job 1. Then, the other jobs are set as Job 2, Job 3, Job 4, and the like in descending order. Therefore, Job A is Job 2.

In Step 4, it is determined whether the disposition of the processing members 29 of Job 2 is switchable based on Job 1. Whether the disposition of the processing member 29 is switchable may be determined, for example, as follows.

When the processing member 29 is the slitter 36, in the slitter unit 20, the sheet S passes through the slitter 36 where the rotating drive blade 58 and the driven blade 59 are brought into pressure contact with each other and are rubbed against each other. In the first unit 20*a* on the most upstream side, a cutting line D for cutting the right end and the left end of the sheet S can be formed.

Figure 8A:
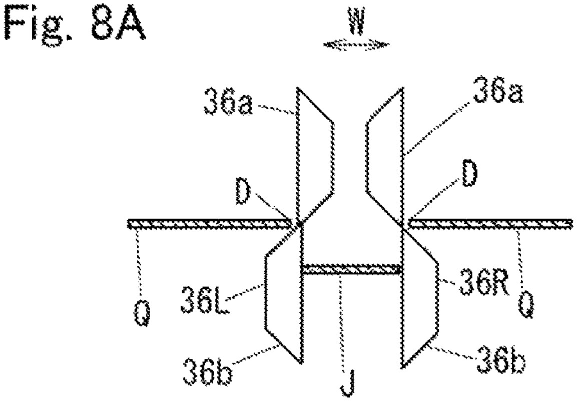
FIG. 8A is a diagram for explaining a specification mode of the apparatus for processing sheets.

As illustrated in FIG. 8A, when the sheet S is cut by cutting processing of the slitter 36 and separated into the workpiece Q and the cutting waste J, it is preferable that the lower cutting blade 36*b* is positioned on the same side as the workpiece Q and the upper cutting blade 36*a* is positioned on the same side as the cutting waste J with respect to the cutting line D in the width direction W. When the lower cutting blade 36*b* is positioned on the same side as the workpiece Q in the width direction W, the lower cutting blade 36*b* can support the workpiece Q on which the cutting line D is formed and separated from the lower side. Thus, conveyance can be appropriately performed to the downstream side. On the other hand, in the width direction W, the upper cutting blade 36*a* is positioned on the same side as the cutting waste J, and thus, the cutting waste J separated from the sheet S can be guided downward by the upper cutting blade 36*a*.

There are four possible combinations in FIGS. 8A-8D as to which two slitters 36 out of the six slitters 361 to 366 installed in the slitter unit 20 are used to form the cutting line D for separating the sheet S into the workpiece Q and the cutting waste J.

Figure 8B:
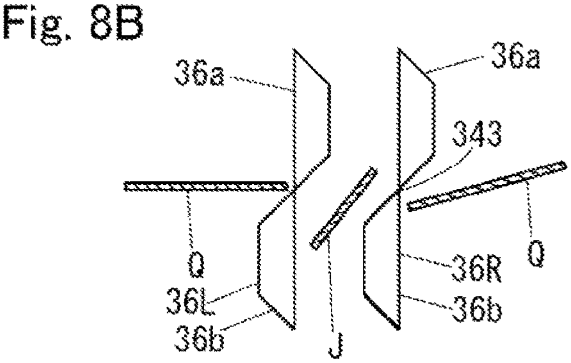
FIG. 8B is a diagram for explaining a specification mode of the apparatus for processing sheets.
Figure 8C:
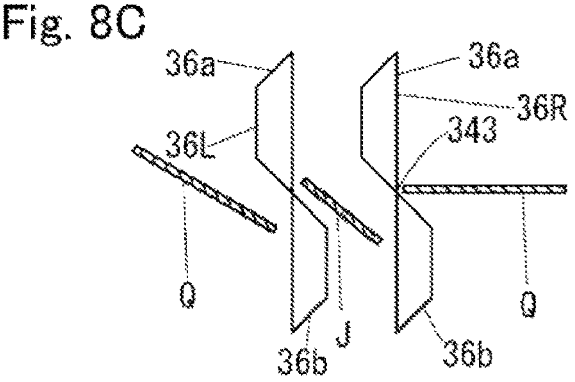
FIG. 8C is a diagram for explaining a specification mode of the apparatus for processing sheets.
Figure 8D:
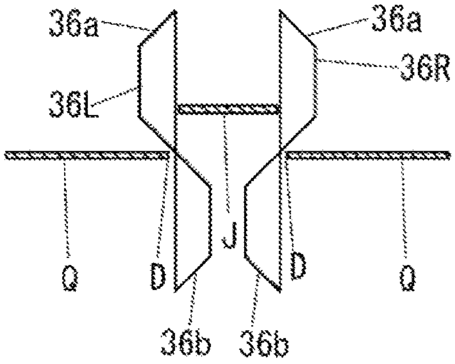
FIG. 8D is a diagram for explaining a specification mode of the apparatus for processing sheets.

In FIGS. 8A and 8B, the cutting blade 36*a* on the upper side of the conveyance path 5 of the left slitter 36L in the figure is positioned on the right side with respect to the cutting line D. In FIGS. 8C and 8D, the cutting blade 36*a* on the upper side of the conveyance path 5 of the left slitter 36L is positioned on the left side with respect to the cutting line D. In FIGS. 8A and 8C, the cutting blade 36*a* on the upper side of the conveyance path 5 of the right slitter. 36R is positioned on the left side with respect to the cutting line D. In FIGS. 8B and 8D, the cutting blade 36*a* on the upper side of the conveyance path 5 of the right slitter 36R is positioned on the right side with respect to the cutting line D.

When unnecessary cutting waste J is generated between the left slitter 36L and the right slitter 36R by cutting the sheet S with the upper cutting blade 36*a* of the left slitter 36L and the right slitter 36R, it is preferable that the upper cutting blade 36*a* is not positioned outside the lower cutting blade 36*b* with respect to the cutting waste J. With respect to the cutting line D separating the workpiece Q and the cutting waste J, it is preferable that at least one of the upper cutting blades 36*a* is positioned on the side where the cutting waste J is generated, and the lower cutting blade 36*b* is positioned on the side where the workpiece Q is generated.

Specifically, as illustrated in FIG. 8D, the combination in which the upper cutting blades 36*a* sandwiching the generated cutting waste J are positioned on the side where the workpiece Q is generated with respect to each cutting line D is not set. In this manner, when the upper cutting blades 36*a* sandwiching the generated cutting waste J are positioned on the side where the workpiece Q is generated with respect to the respective cutting lines D by switching the disposition of the slitter 36, the controller 45 determines that the disposition of the slitter 36 is not switchable.

On the other hand, the controller 45 determines that the disposition of the slitter 36 can be switched in the cases illustrated in FIGS. 8A-8C as the combinations to be set. FIG. 8A in the figure illustrates a combination in which the upper cutting blade 36*a* is positioned inside the lower cutting blade 36*b* with respect to the cutting waste J generated. FIGS. 8B and 8C illustrate combinations in which the upper cutting blade 36*a* of one side is positioned inside the cutting blade 36*b* on the lower side with respect to the cutting waste J to be generated and the upper cutting blade 36*a* of the other side is positioned outside the lower cutting blade 36*b* with respect to the cutting waste J to be generated.

The upper cutting blades 36*a* illustrated in FIG. 8B disposed on the right side of a pressure contact part 343 of the upper and lower cutting blades 36*a* and 36*b* in the right slitter 361 of the first unit 20*a* on the most upstream side, the left slitter 364 of the second unit 20*b* on the middle, and the right slitter 365 of the third unit 20*c* on the most downstream side. These slitters 36 are mutually switchable.

The upper cutting blades 36*a* illustrated in FIG. 8C disposed on the left side of the pressure contact part 343 of the upper and lower cutting blades 36*a* and 36*b* in the slitter 362 on the left side of the first unit 20*a* on the most upstream side, the right slitter 363 of the second unit 20*b* on the middle, and the left slitter 366 of the third unit 20*c* on the most downstream side. These slitters 36 are also mutually switchable.

Figure 9:
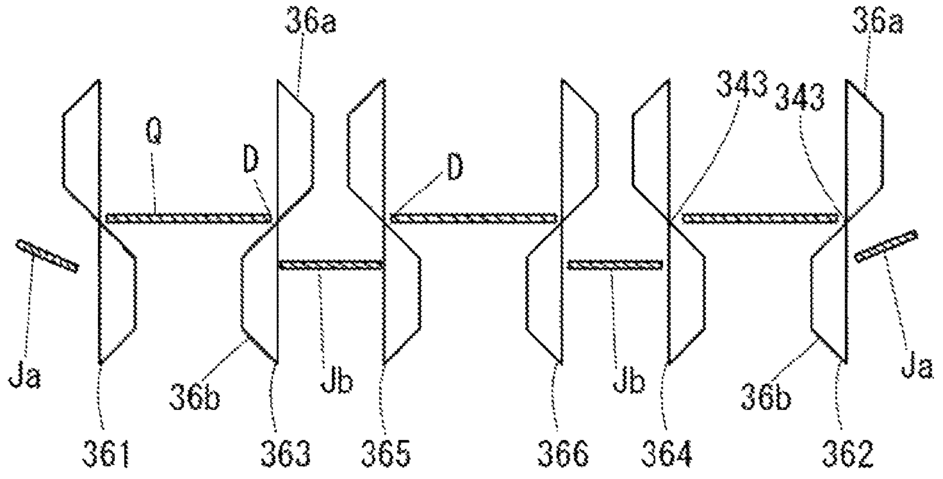
FIG. 9 is a diagram for explaining a usage mode of the apparatus for processing sheets.

By forming the cutting line D on the outermost side of the sheet S by the first unit 20*a* on the most upstream side, forming the cutting line D on the inner side of the first unit 20*a* by the second unit 20*b* on the middle, and forming the cutting line D on the most center side of the sheet S by the third unit 20*c* on the most downstream side, as illustrated in FIG. 9, all the upper cutting blades 36*a* are positioned on the side where the cutting wastes Ja and Jb are generated with respect to the pressure contact part 343 forming the cutting line D, and all the lower cutting blades 36*b* are positioned on the side where the workpiece Q is generated with respect to the pressure contact part 343. Thus, it is possible to appropriately convey the partially processed sheet S to the downstream side while appropriately dropping the cutting waste J.

In the cutting waste dropping mechanism 27, the cutting waste Jb cut from the sheet S by the second unit 20*b* at the center and the third unit 20*c* on the most downstream side in the slitter unit 20 is moved downward to the cutting waste collecting unit 23 at the lower side by the guide 28 and is housed in the housing box 54.

When the processing member 29 is a crease blade (not illustrated) including a rotary concave blade (not illustrated) and a convex blade (not illustrated) that form a crease along the conveyance direction F, it is determined that all such crease blades are switchable with other crease blades of the same type. This is because, unlike the slitter 36, the shape of the concave blade and the convex blade does not differ on the right and left with respect to the processing line of the sheet S in the crease blade. The crease blade may include, for example, a convex blade above the conveyance path 5 and may include a concave blade below the conveyance path 5. Alternatively, a concave blade may be installed above the conveyance path 5, and a convex blade may be installed below the conveyance path 5.

Also when the processing member 29 is a pair of upper and lower perforation blades (not illustrated) including a rotary perforation blade (not illustrated) that forms a perforation and a receiving blade (not illustrated) of the perforation blade, the disposition of the processing member 29 in Step 4 of FIG. 5 is switchable. This is because the rotary perforation blade and the receiving blade are symmetrical with respect to the processing line of the sheet S, similarly to the crease blade.

When the processing member 29 is a half-cut blade (not illustrated) that cuts a part of the sheet S in the thickness direction, it can be determined that the disposition of all the processing members 29 is switchable.

When it is determined in Step 4 of FIG. 5 that the processing members 29 are switchable, the processing proceeds to Step 5, and Job 1 is set as a reference job, and control is performed to switch the disposition of the processing members 29 of the other Jobs 2, 3, and 4.

When it is determined in Step 4 that the slitters 36 are not switchable, for example, when the slitters 36 become as illustrated in FIG. 8D when switched, the process proceeds to Step 6, and control is performed so as not to switch the slitters 36.

In addition, for example, also when the user inputs and instructs setting so as not to switch the disposition of the processing member 29, Step 4 is not satisfied, and the processing proceeds to Step 6.

In this manner, when the processing positions of the sheet S2 and the sheet S3 are different from each other, and the processing position of the subsequent sheet S2 or the sheet S3 is the same as any of the sheets S2 and S3 conveyed ahead, the controller 45 can execute the movement control of causing the processing member 29, which has performed the processing on either the sheet S2 or the sheet S3, to move from the processing position of the sheet S2 or the sheet S3 to the other processing position and perform the processing.

In this case, the user can select whether to execute the standby control in which the processing member 29 is caused to stand by at the standby position, which improves the convenience.

Figure 10:
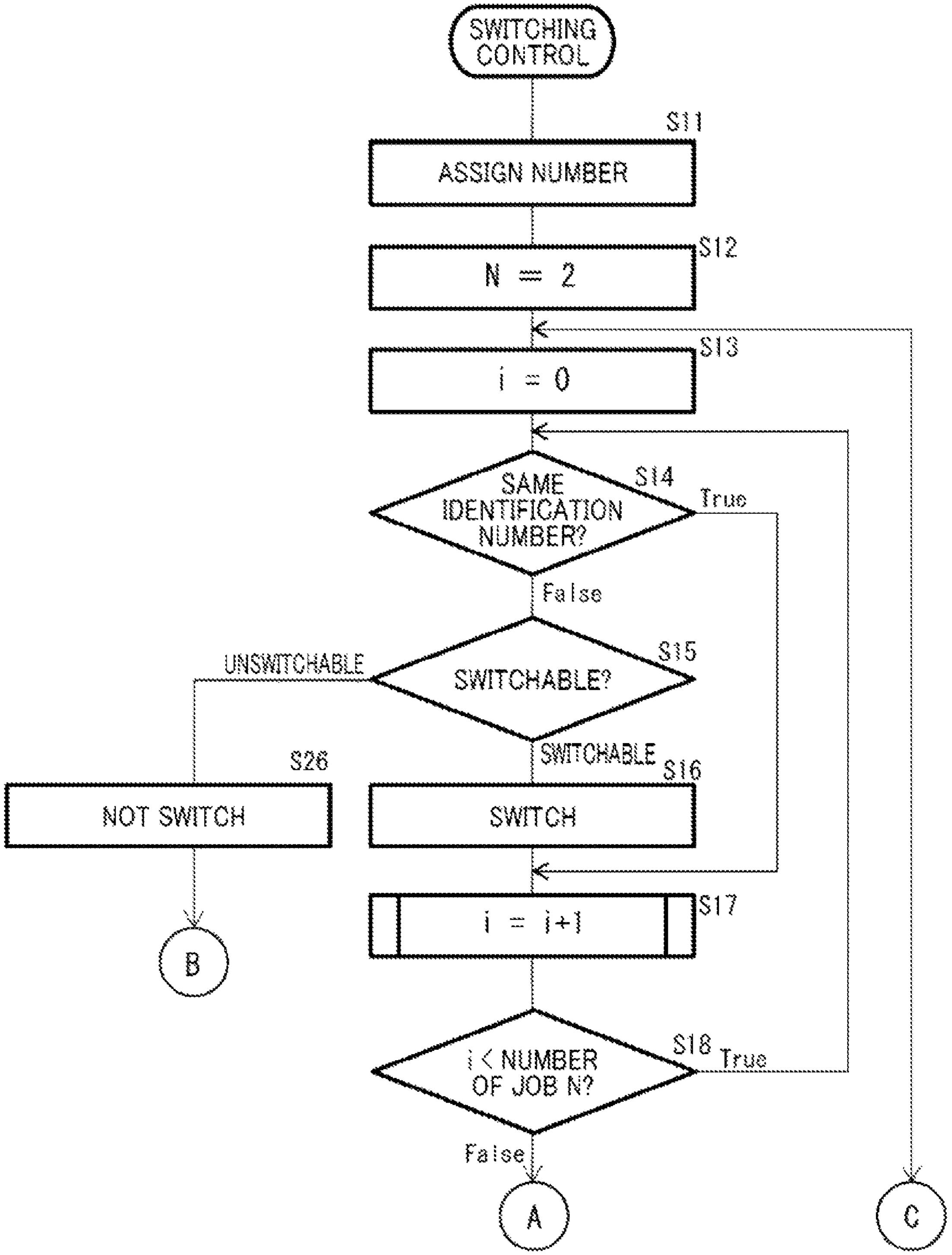
FIG. 10 is a control flow of the apparatus for processing sheets.
Figure 11:
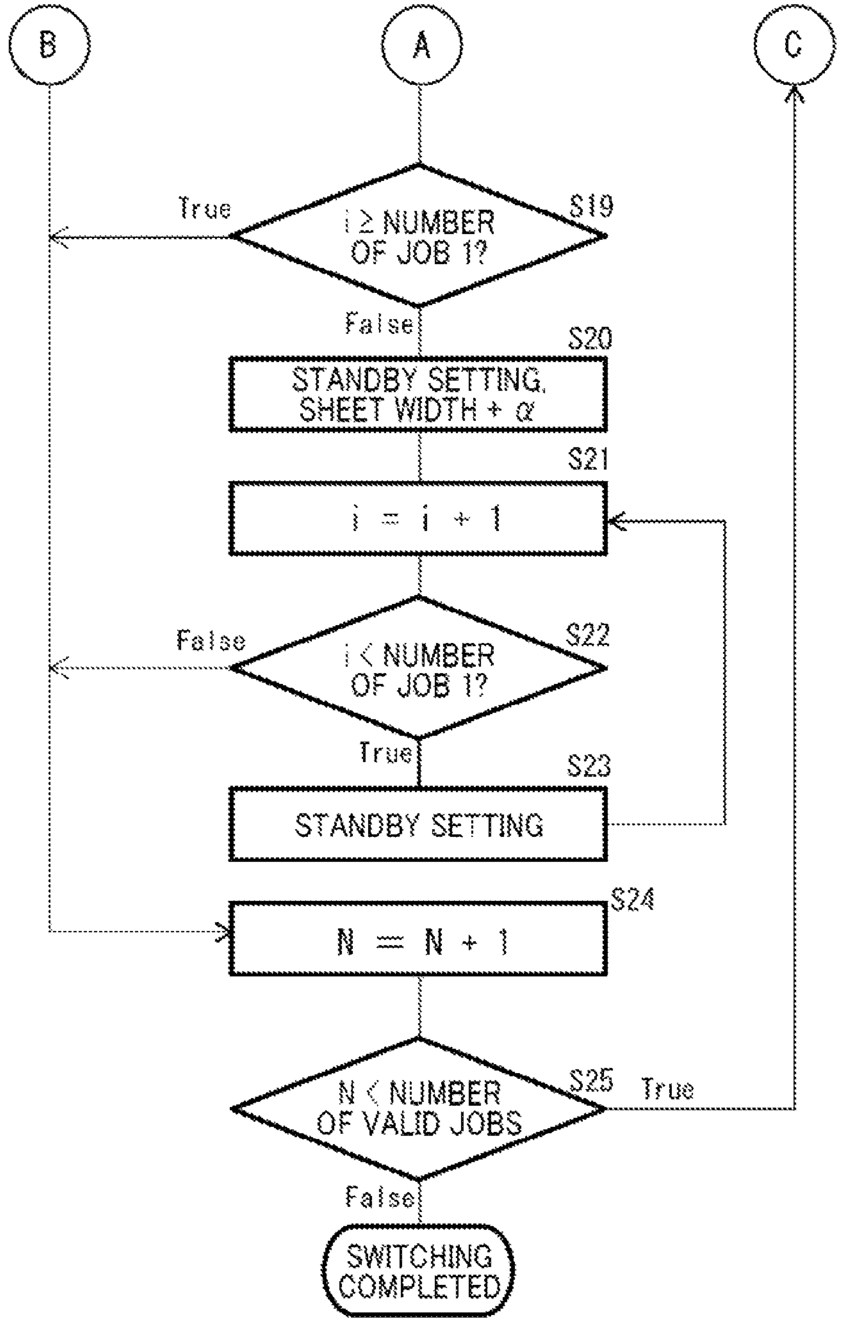
FIG. 11 is a control flow of the apparatus for processing sheets.

FIGS. 10 and 11 illustrate a detailed flow in a case where the disposition of the slitters 36 as the processing member 29 in Step 5 in FIG. 5 is switched. The disposition of the slitters 36 of Job 1 as a reference is processing along the conveyance direction F of the sheet S3 illustrated in FIG. 7. With respect to the disposition of the slitters 361, 362, 363, and 365 of Job 1 illustrated in FIG. 7, which processing position is taken by the slitters 361 and 362 of Job 2 illustrated in FIG. 6 and which slitter is to be switched with another slitter is determined in order. Then, it is determined whether to switch the pair of right and left slitters 361 and 362 of the first unit 20*a* used in Job 2 with the slitters 363, 364, 365, and 366 of any of the other units 20*b* and 20*c*, and it is determined where to position the switched slitter 36 in the width direction W in the case of switching.

In Step 11 of FIG. 10, the plurality of slitters 361, 362, 363, and 365 whose positions in the width direction W have been determined in Job 1 and Job 2 are numbered in ascending order of length from the reference line G.

In Step 12, the job number N is set to 2. In Step 13, i=0. i is set to consider whether to switch the slitter 36 in order from the slitter 36 positioned at a position having the shortest length from the reference line G.

Figure 12:
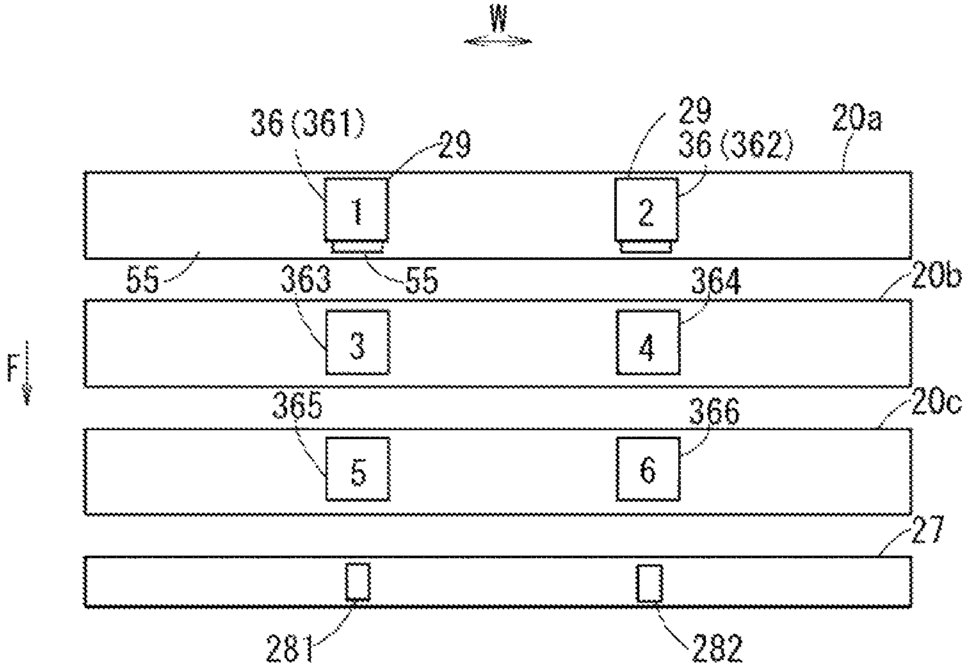
FIG. 12 is a view for explaining disposition of a processing member of the apparatus for processing sheets.

In Step 14, it is determined whether the identification number of the first slitter 361 having the length L1 from the reference line G of Job 2 is the same as the identification number of the first slitter 361 having the shortest length from the reference line G of Job 1. For example, identification numbers as illustrated in FIG. 12 are assigned in advance to all the slitters 36 installed in the slitter unit 20. FIG. 12 illustrates a case where the identification number is 1 for the left slitter 36 of first tout 20*a*, 2 for the right slitter 36, 3 for the left slitter 36 of the second unit 20*b*, 4 for the right slitter 36, 5 for the left slitter 36 of the third unit 20*c*, and 6 for the right slitter 36.

The identification number of the first slitter 36 of Job 2 is 1, which is the same as the identification number 1 of the first slitter 36 of Job 1. In this case, since the slitter 36 having the same identification number 1 is used in both Job 1 and Job 2, there is no need to perform switching. At this time, Step 14 is satisfied, and the process proceeds to Step 17.

Here, when the lengths L1 and L3 are the same from the reference line G, the widths of the cutting wastes Ja at the left side end edges SL of the sheet S2 and the sheet S3 are the same. In this case, the position of the left slitter 361 of the first unit 20*a* is not moved between the sheet S2 and the sheet S3, and processing is continued at the same position.

On the other hand, when the lengths L1 and L3 from the reference line G are different, the lengths in the width direction W of the cutting waste Ja of the left side end edge SL of the sheet S2 and the sheet S3 are different. In this case, the position of the left slitter 361 of the first unit 20*a* in the width direction W is moved from the position L1 to the position L3 by the moving unit 51 after the processing of the preceding sheet S2 and before the processing of the subsequent sheet S3. At this time, the slitter 361 is moved by a difference between L1 and L3.

When a plurality of sheets S1 having the same arrangement pattern are continuously processed, the sheet S3 is conveyed and then the sheet S2 is conveyed in the processing device 7. In this case, after the processing of the preceding sheet S3 and before the processing of the subsequent sheet S2, the position of the slitter 36 is moved from the position L3 to the position L1.

In this manner, the controller 45 processes the cutting line D3 of the sheet S3 using the slitter 36 as the processing member 29 that minimizes the moving distance from the processing position of the sheet S2 when the processing positions L1 and L3 in the width direction W by the slitter 361 as the processing member 29 are different between the sheet S2 conveyed ahead by the conveyance unit 18 and the subsequent sheet S3, or between the preceding sheet S3 and the subsequent sheet S2.

This configuration can shorten the time required for the slitter 361 to move in the width direction W between the sheet S2 and the sheet S3. The time required to discharge the sheet S1 to the stacker device 8 after the processing of the sheet S1 is started can be shortened.

In Step 17, i is incremented. Then, whether to switch the second slitter 36 from the reference side from the slitter 362 of Job 2 to another slitter 36 as the next slitter 36 is determined.

The process proceeds to Step 18, and it is determined whether the numerical value of i is smaller than the number of slitters 36 used in Job 2. In Step 18, whether all the slitters 36 to be used in Job 2 have been determined is checked. Job 2 uses two slitters 36, and i=1, which is smaller than number 2 of slitters 36 in Job 2 and satisfies Step 18. That is, at the present time, the slitter 36 to be used has been determined only for the first slitter 361 having the shortest length from the reference line G. At this time, Step 18 is satisfied, and the process returns to Step 14.

In Step 14, it is determined whether the identification number of the second slitter 36 having the length L2 from the reference line G of Job 2 illustrated in FIG. 6 is the same as the second identification number of Job 1 illustrated in FIG. 6. In Job 1, the identification number of the second slitter 36 is 3, and the identification number of Job 2 is 2. In this case, the two jobs do not satisfy Step 14, and the process proceeds to Step 15.

In Step 15, it is determined whether the slitter 36 with the second identification number 2 of Job 2 is switchable with the slitter 36 with the identification number 3 of Job 1. When they are not switchable, Step 15 is not satisfied, and the process proceeds to Step 26. In Step 26, the position of the slitter 36 is not changed with the setting of Job 2.

When the identification number 2 and the identification number 3 are switchable, Step 15 is satisfied, and the process proceeds to Step 16. As illustrated in FIG. 9, in the slitter 362 with identification number 2 and the slitter 363 with identification number 3, the lower cutting blade 36*b* is positioned on the left side and the upper cutting blade 36*a* is positioned on the right side with respect to the cutting line D. In this case, even when the slitters 362 and 363 with the identification number 2 and the identification number 3 are switched, the workpiece Q can be appropriately conveyed to the downstream side, and the cutting waste J can be removed from the conveyance path 5 and dropped.

In this manner, when it is determined that the identification number 2 and the identification number 3 are switchable, in Step 16, the second slitter 36 from the reference line G side of Job 2 is set to be changed from the identification number 2 to the identification number 3.

Figure 13:
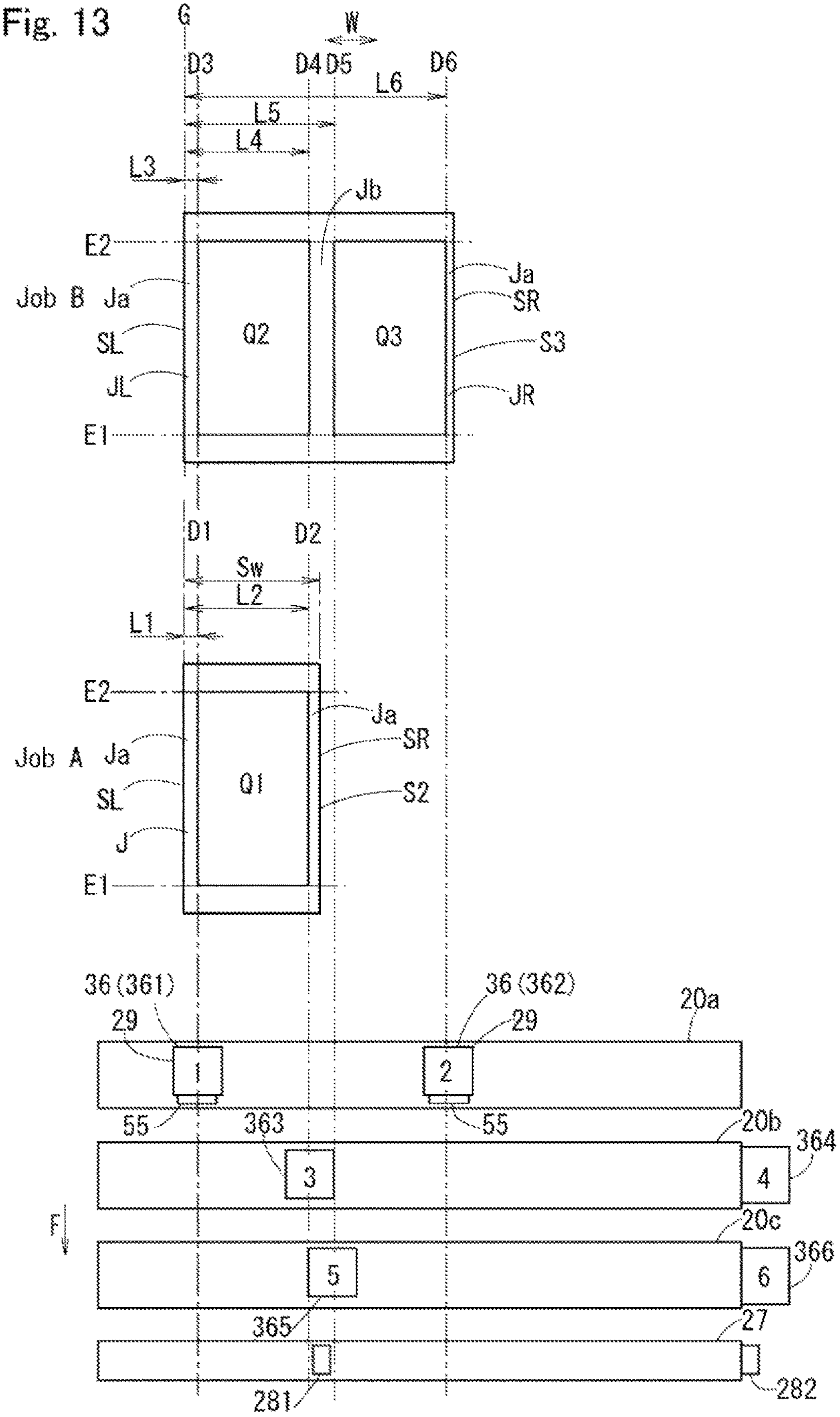
FIG. 13 is a view for explaining disposition of the processing member of the apparatus for processing sheets.

By switching the slitter 362 and the slitter 363 with each other like this, the slitter 363 can be used for the processing of the cutting line D2 of the sheet S2. FIG. 13 is a diagram illustrating which ones of the slitters 361 to 364 are used to cut the cutting lines D1 to D6 of the sheet S2 and the sheet S3 alternately conveyed back and forth.

When cutting positions of the sheets S2 and S3 conveyed back and forth by the conveyance unit 18 in the width direction W cut by the slitters 361, 362, 363, and 365 are different from each other as in the cutting lines D1 and D2 and the cutting lines D3 to D6 like Job A and Job B, the controller 45 can form the cutting line D2 of the sheet S2 having the minimum moving distance from the cutting position using the slitter 363 that forms the cutting line D4 of the sheet S3.

Thus, when Jobs A and B are alternately performed, after the sheet S2 is cut, processing can be made without moving the slitter 362 in the width direction W with the moving unit 51 from the position where the cutting line D2 having the length L2 from the reference line G is formed to the position where the cutting line D6 having the length L4 is formed. The left slitter 363 of the second unit 20*b* can be used to form the cutting line D2 of the sheet S2.

Then, the left slitter 363 of the second unit 20*b* on which the second cutting line D2 of the sheet S2 is formed is used to form the fourth cutting line D4 of the subsequent sheet S3. After the cutting line D4 is formed, the left slitter 263 of the second unit 20*b* can be used again for forming the cutting line D2 of the sheet S2. Thus, the sheet S2 can be processed without moving the slitter 362 with the moving unit 51 in the width direction W from the position where the cutting line D6 having the length L4 from the reference line G is formed to the position where the cutting line D2 having the length L2 from the reference line G of the sheet S2 is formed. As a result, the time required for the movement of the slitter 36 can be shortened. The processing of the sheet S1 can be performed quickly.

In particular, when a plurality of sheets S1 illustrated in FIG. 4 are continuously processed by the apparatus for processing sheets 100, the sheet S1 is cut at the cutting line C1 by the cutting device 3 on the upstream side, and then Job A and Job B are alternately and repeatedly performed in the processing device 7. At this time, it is possible to avoid a situation in which the processing speed is extremely slow because it is necessary to move the slitter 362 every time between the sheets S2 and S3 conveyed back and forth.

Here, when L2 and L4 have the same length, the length from the reference line G to the cutting line D2 of the sheet S2 and the length from the reference line G to the cutting line D4 of the sheet S3 are the same. In this case, the left slitter 363 of the second unit 20*b* continuously performs processing of both the sheet S2 and the sheet S3 while maintaining the same position without moving in the width direction W.

On the other hand, when the lengths of L2 and L4 are different, the position of the left slitter 363 of the second unit 20*b* in the width direction W is moved in the width direction W by a difference between L2 and L4 in processing the sheet S2 and in processing the sheet S3.

The process proceeds to Step 17, and i is incremented. In Step 18, it is determined whether the numerical value of i is smaller than the number of slitters 36 used in Job 2. The numerical value of i at this point is 2, and the number of slitters used in Job 2 is 2. Thus, Step 18 is not satisfied, and the process proceeds to Step 19 in FIG. 11.

In Step 19, it is determined whether the numerical value of i is larger than or equal to the number of slitters 36 used in Job 1. At this point, the numerical value of i is 2, and the number of slitters 36 used in Job 1 is 4. Thus, Step 19 is not satisfied, and the process proceeds to Step 20.

In Step 20, the slitter 365 having the third length L5 from the reference line G of Job 1 is set to cut the subsequent sheet S2 while causing the sheet S2 to wait at a standby position within a predetermined range from the position where the sheet S3 has been conveyed ahead and cut in Job 1.

Further, it is determined whether the processing position of the third cutting line D5 from the reference line G of the sheet S3 conveyed ahead by the processing device 7 is within a predetermined value from the position of the right side end edge SR in FIG. 13 in the conveyance path 5 of the subsequent sheet S2. When the difference between the formation position of the third cutting line D5 from the reference line G of the sheet S3 and the conveyance position in the width direction W of the right side end edge SR of the sheet S2 is within a predetermined value, the slitter 365 positioned within a predetermined value from the side end edge Sw of the subsequent sheet S2 is moved from the standby position where the sheet S3 is previously conveyed within a predetermined range from the formation position of the cutting line D5 to the avoidance position where the slitter is moved by a predetermined amount α in the right direction in FIG. 13 away from the subsequent sheet S2, and the avoidance control of processing the subsequent sheet S2 is performed.

This prevents the slitter 365 as the processing member 29 from remaining positioned within a predetermined value from the right side end edge SR of the conveyed sheet S2 when processing the sheet S2. When the slitter 365 is positioned at the position of the right side end edge SR of the sheet S2, very short cutting waste J in which the length in the width direction W is equal to or less than a predetermined value may be generated. It is difficult to remove such cutting waste J from the conveyance path 5 with its own weight or the guides 55 and 28. By moving the slitter 365 in a direction away from the sheet S2 during the processing of the sheet S2, it is possible to avoid that cutting waste 3 having a narrow width remains in the vicinity of the drive blade 58 and the driven blade 59 or in the conveyance path 5 to cause a defect at the time of cutting or paper jam.

After the sheet S2 is processed in a state where the slitter 365 is positioned at the avoidance position, the slitter 365 is moved to the original standby position before the subsequent sheet S3 is conveyed to the slitter 365 installation position.

In Step 21, i is incremented. In Step 22, it is determined whether the numerical value of i is less than the number of slitters 36 used in Job 1. At this point, since the numerical value of i is 3 and the number of slitters used in Job 1 is 4, Step 22 is satisfied and the process proceeds to Step 23.

In Step 23, the slitter 362 forming the cutting line D6 of the sheet S3, which is the slitter 36 having the fourth length from the reference line, is set to stand by at the cutting line D6 forming position of the sheet S3 when the sheet S2 is processed. As a result, the right slitter 362 of the first unit 20*a* stands by at the standby position without performing the processing during the processing of the sheet S2.

That is, when a plurality of sheets S having the arrangement pattern illustrated in FIG. 4 are continuously processed by the apparatus for processing sheets 100, first, the sheet S is cut one by one along the cutting line C in the upstream cutting device 3, and is divided into the sheet S2 and the sheet S3. Thereafter, two types of sheets S2 and S3 having different lengths in the first direction A are alternately conveyed to the downstream processing device 7.

When the sheet S3 is conveyed ahead, the subsequent sheet S2 is conveyed, and the sheet S3 is conveyed further behind, the controller 45 executes a standby control of processing the subsequent sheet S2 while causing the slitter 362 as the processing member 29 whose processing position in the width direction W of the sheet S3 is within a predetermined range from the processing position of the sheet S3 conveyed ahead to stand by within the predetermined range from the position where the processing has been performed on the sheet S3 conveyed ahead.

As a result, the position of the slitter 362 in the width direction W can be kept at the position where the length from the reference line G is L6 without moving the position and performing switching every time the sheets S2 and S3 are alternately conveyed between the positions of the reference lines G to L2 and the positions of the reference lines G to L6 in the drawing. The time required to move the slitter 362 in the width direction W can be shortened. The processing speed increases.

Thus, when different types of jobs are repeatedly executed as in Job A and Job B, the controller 45 uses the slitter 36 as the processing member 29 that minimizes the movement distance from the processing position of the sheet S3 to control the position of the slitter 36 as the processing member 29 that performs processing on the sheet S3 to be within a predetermined range. This configuration can shorten the processing time.

The process returns to Step 21 from Step 23. In Step 21, i is incremented. In Step 22, it is determined whether the numerical value of i is less than the number of slitters 36 used in Job 1. At this point, the numerical value of i is 4, and the number of slitters used in Job 1 is 4, thus, Step 22 is not satisfied. In this case, the process proceeds to Step 24.

In Step 24, N is incremented. The process proceeds to Step 25 and determines whether the numerical value of N is smaller than the number of valid jobs. When there are three or more job types, Step 25 is satisfied, and the process returns to Step 13 illustrated in FIG. 10. Steps 13 to 25 are performed again to determine, for another job, whether to switch all the processing members 29 to be used in Job 1 to the other processing members 29 for another job or to c use them to wait within a predetermined range from the processing position. Then, as necessary, in another job, the processing member 29 is switched to another processing member 29, and is set to stand by within a predetermined range from the processing position of Job 1.

In the processing of the sheet S1 illustrated in FIG. 4, at the time of Step 25, the numerical value of N is 3, and the numerical value of the valid job is 2. Thus, Step 25 is not satisfied, and the process ends.

Function

An operation of the apparatus for processing sheets 100 will be described below.

The user inputs various processing information with the operation panel 46. Instead of this manual input, a job may be separately generated on a personal computer and read. In addition, a job generated in advance on a personal computer and stored in a memory may be called. Further, the processing information may be automatically input by reading the information printed on the sheet S by the reading unit 26.

The user stacks the sheet S on the sheet feeding tray 21 of FIG. 1. The sheet S is sent out by an air sheet feeding unit. When the leading end of the sheet S reaches the leading end sensor 31 of the cutting device 3, the sheet S1 is conveyed by the pair of conveyance rollers 39.

In the cutting device 3, the leading end sensor 31 detects the inclination angle of the sheet S itself with respect to the first direction A at the time of conveyance. Subsequently, the inclination angle of the print image formed on the sheet S with respect to the first direction A is detected by the laser sensor 32. In addition to the inclination angle of the print image, the inclination angle of the sheet S itself may be detected by the laser sensor 32.

Based on the detected inclination angle of the print image, the cutting device 3 adjusts the angle of the movable blade unit 34 of a cross-cutting unit so that appropriate cutting can be performed on the print image regardless of the inclination angle of the conveyed sheet S1 itself. When the cutting position C1 along the second direction B of the sheet S1 reaches the cutting blade installation position, the conveyance of the sheet S1 is stopped and the sheet S1 is cut. The cut sheet S1 is divided into the sheet S2 and the sheet S3. Each of the sheets S2 and S3 is discharged to the cross conveyor device 4 by the pair of conveyance rollers 39.

The sheets S2 and S3 that have reached the cross conveyor device 4 are conveyed in the second direction B along the guide wall 402. Then, the sheets reach the processing device 7.

In the sheet S2, in the slitter unit 20 of the processing device 7, the cutting lines D1 and D2 are formed by the slitters 361 and 363 along the conveyance direction F of the conveyance unit 18 of the processing device 7. When the positions where the cutting lines E1 and E2 of the sheet S2 are formed reach the cutting blade 69 installation position of the cutter unit 22, the conveyance by the conveyance unit 18 stops. The upper movable blade 71 comes close to the lower fixed blade 73, and the cutting lines E1 and E2 are formed along the width direction W.

In the sheet S3, in the slitter unit 20 of the processing device 7, the cutting lines D3, D4, D5, and D6 along the conveyance direction F of the conveyance unit 18 of the processing device 7 are formed by the slitters 361, 363, 365, and 362, respectively. When the positions where the cutting lines E1 and E2 of the sheet S3 are formed reach the cutting blade 69 installation position of the cutter unit 22, the conveyance by the conveyance unit 18 stops. The upper movable blade 71 comes close to the lower fixed blade 73, and the cutting lines E1 and E2 are formed along the width direction W. The workpiece Q obtained by processing the sheets S2 and S3 is discharged to the stacker device 8.

Second Embodiment

Figure 14:
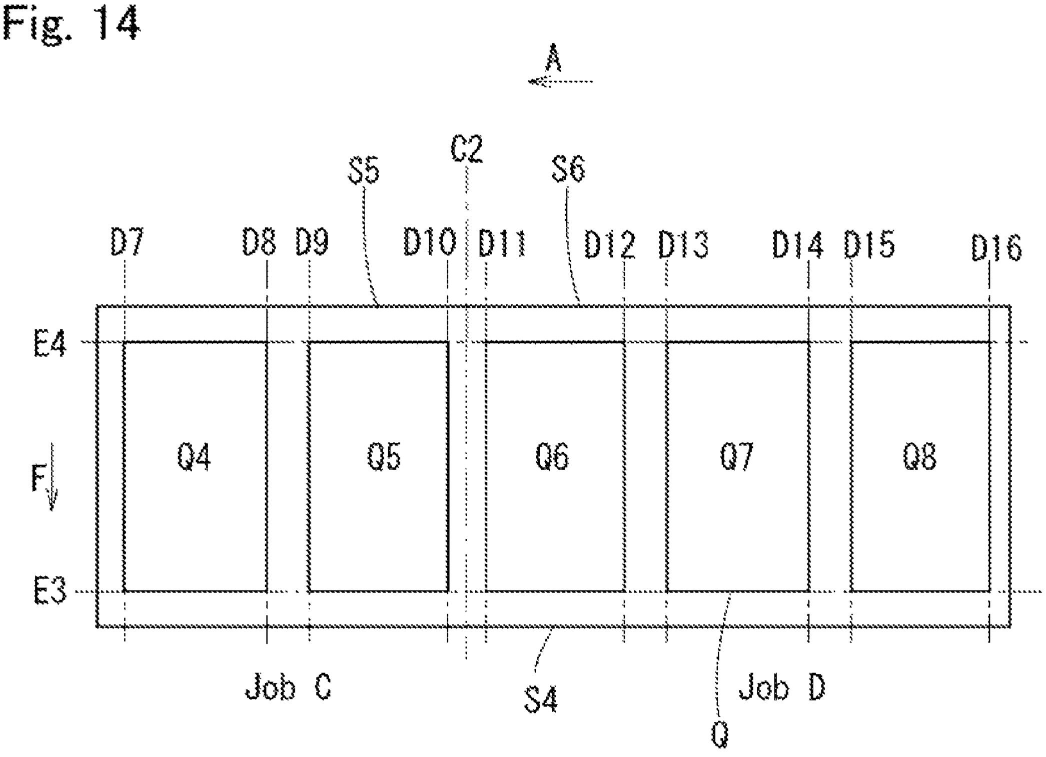
FIG. 14 is a plan view illustrating another sheet processed by the apparatus for processing sheets.

FIG. 14 is a plan view illustrating a workpiece arrangement pattern of a sheet S4 according to a second embodiment. The apparatus for processing sheets 100 according to the second embodiment has the same mechanical configuration as the apparatus for processing sheets 100 according to the first embodiment. In addition, the controller 45 of the apparatus for processing sheets 100 according to the second embodiment is controlled according to the same control flow as the controller 45 according to the first embodiment.

The sheet S4 in FIG. 14 is configured to produce five workpieces Q4 to Q8 without creases from one sheet S4. The five workpieces Q4 to Q8 have substantially the same size and shape, but may have different sizes and shapes.

In the cutting device 3, first, the sheet S4 conveyed in the first direction A is cut at a position C2 of ⅖ in the first direction A that is the longitudinal direction of the sheet S4 from the leading end Sf of the sheet S4 in the first direction A along the second direction B orthogonal to the first direction A.

The sheet S4 is divided into two sheets of a sheet S5 and a sheet S6. The direction of conveying the sheets S is changed to the second direction 13 by the cross conveyor device 4, and the sheets S5 and S6 are conveyed to the processing device 7 one by one in the order of the sheet S5 and the sheet S6.

Next, the sheet S5 to be conveyed in the second direction A is cut along the conveyance direction F at four cutting lines D7 to D10 parallel to the conveyance direction F of the conveyance unit 18 in the processing device 7. Then, cutting is sequentially performed along the width direction W orthogonal to the conveyance direction F at the cutting lines E3 and E4. Thereafter, the sheet S6 is conveyed in the conveyance direction F. The sheet S6 is cut along the conveyance direction F at six cutting lines D11 to D16 parallel to the conveyance direction F. Then, cutting is sequentially performed along the width direction W intersecting the conveyance direction F at the cutting lines E3 and E4.

When the sheet S4 according to the second embodiment is processed, similarly to the first embodiment, it is determined which processing member 29 is moved to where in the width direction W to process the sheet S4 according to the control flow illustrated in FIGS. 5, 10, and 11.

In Step 1 of FIG. 5, a job related to the disposition of the processing member 29 on the conveyance path 5 is constructed based on the arrangement pattern of the workpieces Q4 to Q8 on the sheet S5 and the sheet S6. In the processing illustrated in FIG. 14, four cutting lines D7 to D10 are set for the sheet S5 conveyed to the processing device 7 ahead. Six cutting lines D11 to D16 are set on the subsequent sheet S6. The controller 45 generates two types of Jobs C and D in which cutting positions of the slitter 36 as a processing position in the width direction W using the slitter 36 as the processing member 29 are different between the sheet S5 conveyed ahead by the conveyance unit 18 and the subsequent sheet S6.

Figure 15:
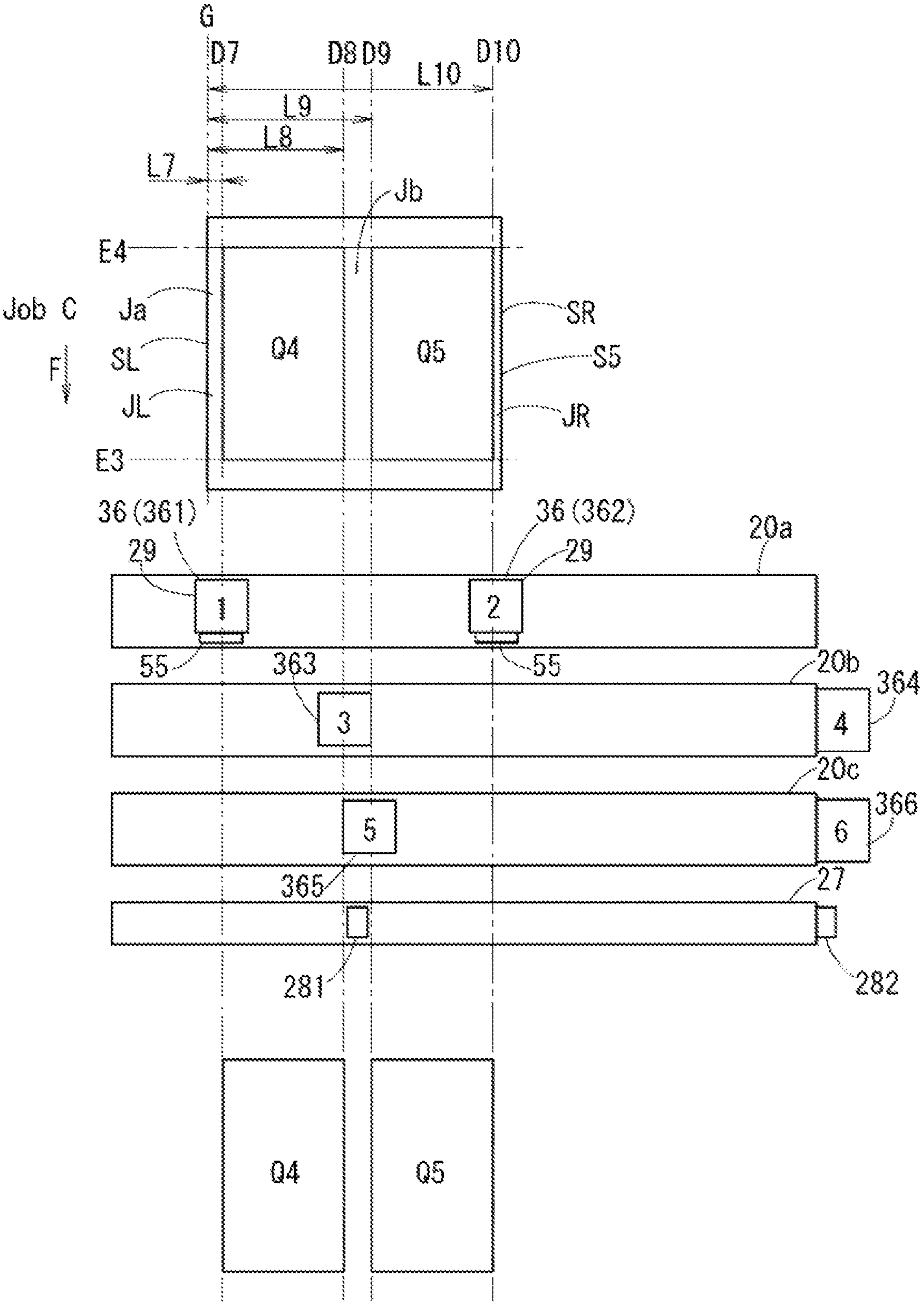
FIG. 15 is a view for explaining disposition of a processing member of the apparatus for processing sheets.

FIG. 15 is a diagram for explaining a disposition of the slitter 36 as the processing member 29 in Job C. In Job C, four cutting lines D7 to D10 along the conveyance direction F of the processing device 7 are set similarly to the processing process of Job A of the first embodiment illustrated in FIG. 7. To process the sheet S5, the pair of left and right slitters 361 and 362 of the first unit 20*a*, the left slitter 363 of the second unit 20*b*, and the left slitter 365 of the third unit are to be used as the processing member 29.

Figure 16:
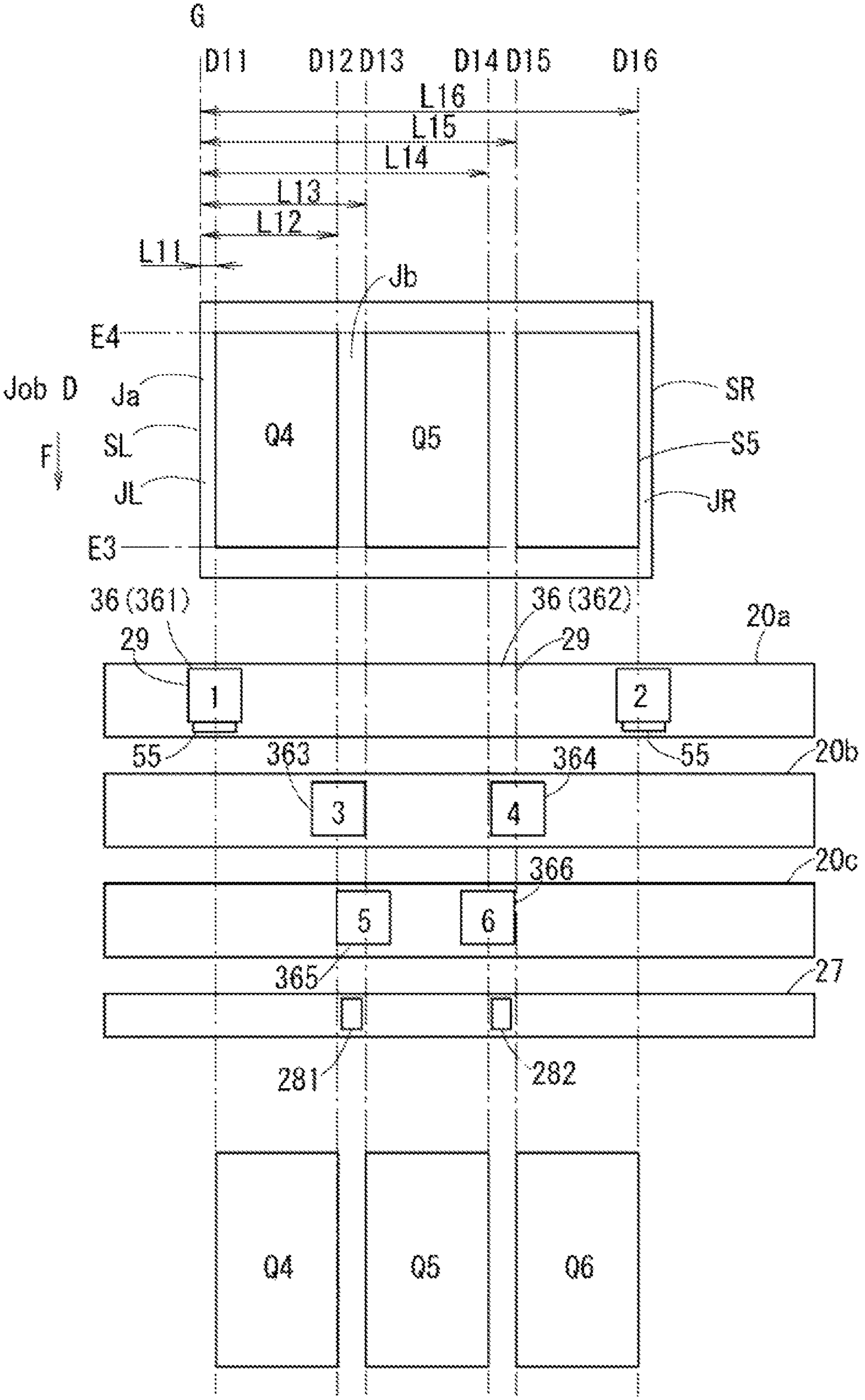
FIG. 16 is a view for explaining disposition of the processing member of the apparatus for processing sheets.
Figure 17:
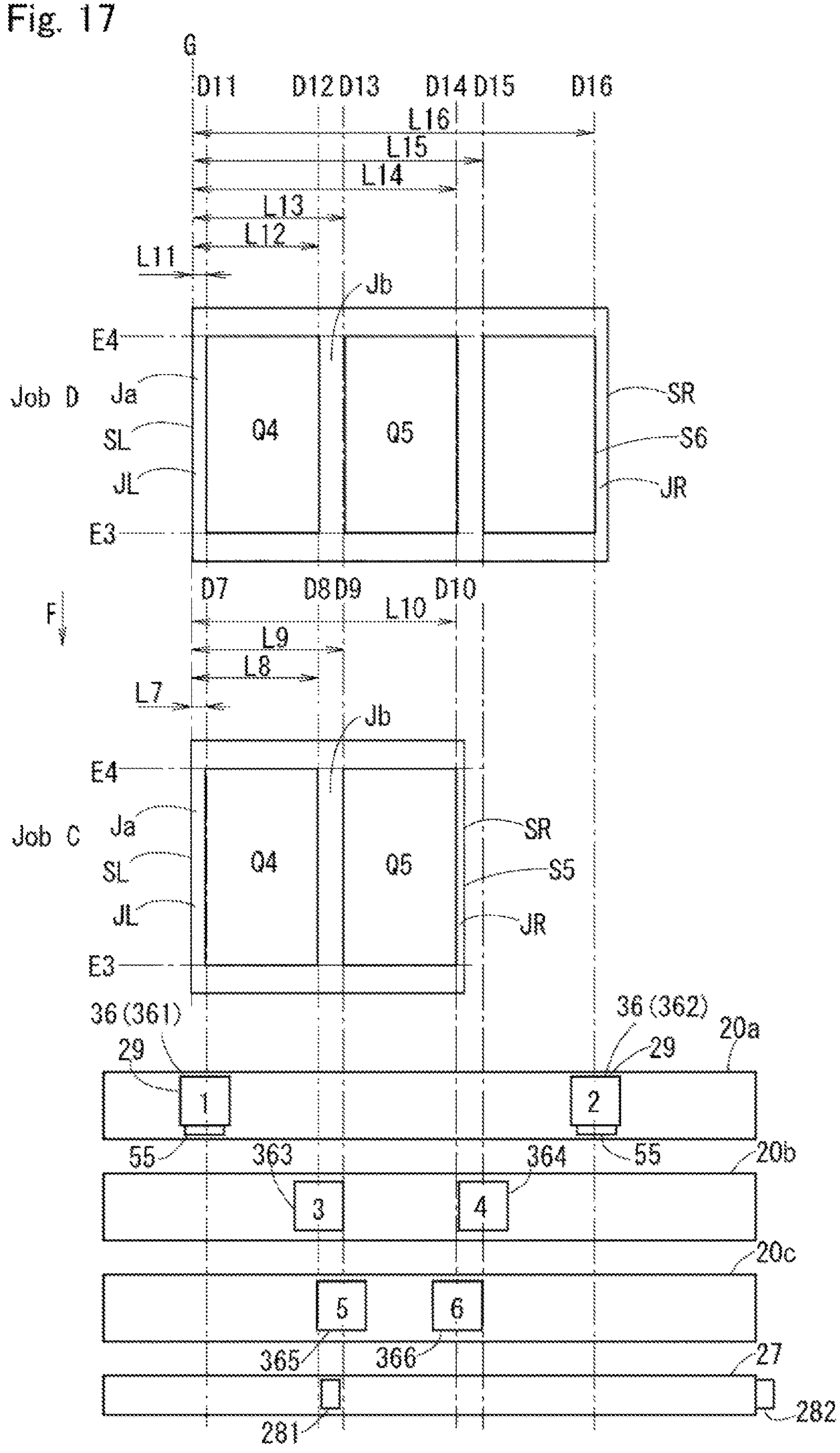
FIG. 17 is a view for explaining disposition of the processing member of the apparatus for processing sheets.

FIG. 16 is a diagram for explaining a disposition of the slitter 36 as the processing member 29 in Job D. In Job D, six cutting lines D11 to D16 are set along the conveyance direction F. To process the sheet S6, all the slitters 361 to 366 of the first to third units 20*a* to 20*c* installed in the slitter unit 20 are used.

The cutting lines D11 and D16 in the vicinity of both left and right side end edges of the sheet S6 are formed by using the slitter 361 and 362 having the guide 55 of the first unit 20*a*. The cutting lines D12 and D15 that are on the center side of the sheet S6 than the cutting lines D11 and D16 of the sheet S6 are formed by using the slitter 363 and 364 of the second unit 20*b*. The cutting lines D13 and D14 closest to the center of the sheet S6 are formed by the slitter 365 and 366 of the third unit 20*c*.

The pair of left and right guides 28 of the cutting waste dropping mechanism 27 are moved to positions between the slitter 363 and the slitter 365 and between the slitter 366 and the slitter 364.

In Step 2 of FIG. 5, the constructed Jobs C and D are sorted in descending order by the number of necessary processing members 29. The number of slitters 36 used in Job C is 4. The number of slitters used in Job D is 6. In this case, when Job C and Job D are sorted in descending order, the first job is Job D, and the second job is Job C.

Job D determined as having the largest number of slitters 36 required in Step 3 is set as a reference job. This reference Job D is defined as Job 1. The other Job C is defined as Job 2.

In Step 4, it is determined whether the disposition of the processing member 29 of Job C set as Job 2 is switchable with another processing member 29. When it is determined in Step 4 that the processing members 29 are switchable, the processing proceeds to Step 5, and Job 1 is set as a reference job, and control is performed to switch the disposition of the processing members 29 of the other Job 2. When the processing members 29 are not switchable in Step 4, the process proceeds to Step 6 and ends without performing switching.

In the second embodiment, when the control flow illustrated in FIGS. 10 and 11 is executed, the plurality of slitters 361 to 366 whose positions in the width direction W have been determined in Job 1 and Job 2 are numbered in ascending order of length from the reference line G in Step 11 of FIG. 10.

In Step 12, the job number N is set to 2. The disposition of the slitter 36 of Job D, which is set as reference Job 1, is processing along the conveyance direction F of the sheet S6 illustrated in FIG. 15. With respect to the disposition of the slitter 36 of Job 1 illustrated in FIG. 15, which processing position is taken by the slitter 36 of Job C illustrated in FIG. 16 set as Job 2 is sequentially determined. In Step 13, i=0.

In Step 14, it is determined whether the identification number of the first slitter 361 of Job 2 is the same as the identification number of the first slitter 361 of Job 1.

The identification number of the first slitter 361 of Job 2 is 1, which is the same as the identification number 1 of the first slitter 361 of Job 1. In this case, since the slitter 361 having the same identification number 1 is used in both Job 1 and Job 2, there is no need to perform switching. At this time, Step 14 is satisfied, and the process proceeds to Step 17.

In Step 17, i is incremented. The process proceeds to Step 18, and it is determined whether the numerical value of i is smaller than the number of slitters 36 used in Job 2. Job 1 uses six slitters 36, and i=1, which is smaller than 6, the number of slitters of Job 1. In this case, Step 18 is satisfied, and the process returns to Step 14.

In Step 14, it is determined whether the identification number of the second slitter 36 of Job 2 illustrated in FIG. 15 is the same as the second identification number of Job 1 illustrated in FIG. 16. In Job 1, the identification number of the second slitter 36 is 3, and the identification number of Job 2 is also 3. Thus, both are the same. In this case, like the first slitter 361, Step 14 is satisfied, and the process proceeds to Step 17. In Step 17, i is incremented. The process proceeds to Step 18 and determines whether i is smaller than 4, the number of the slitters 36 of Job 2.

In Step 18, i is 2 at this time. It is smaller than 4, the number of the slitters 36 of Job 2. Thus, Step 18 is satisfied, and the process returns to Step 14.

In Step 14, it is determined whether the identification number of the third processing member 29 of Job 2 is the same as the identification number of the third slitter 36 of Job 1. The third slitter 36 are 5 in both Job 1 and Job 2, which satisfies Step 14. In Step 17, i is incremented. In Step 18 it is determined whether i is smaller than 4, the number of the slitters 36 of Job 2. At this point, the value of i is 3. The number of all the slitters 36 in Job 2 is 4. In this case, Step 18 is satisfied, and the process returns to Step 14.

In Step 14, the fourth identification number of Job 2 is 2, and the identification number of the fourth slitter 36 of Job 1 is 6. In this case, the two jobs do not satisfy Step 14, and the process proceeds to Step 15. In Step 15, it is determined whether the slitter 362 with the fourth identification number 2 of Job 2 is switchable with the slitter 36 with the identification number 6 of Job 1.

From FIG. 9, in both the slitter 362 with the identification number 2 and the slitter 366 with the identification number 6, the lower cutting blade 36*b* is positioned on the left side and the upper cutting blade 36*a* is positioned on the right side with respect to the pressure contact part 343 of the upper and lower cutting blades 36*a* and 36*b*. In this case, the slitter 362 and the slitter 366 are switchable. Since Step 15 is satisfied, the process proceeds to Step 16.

In Step 16, the fourth slitter 36 from the reference line G side of Job 2 is set to be changed from identification number 2 to identification number 6. By switching the slitter 362 with the slitter 366, the slitter 366 is used for the processing of the cutting line D10 of the sheet S5. When the sheet S5 and the sheet S6 are alternately conveyed, the cutting line 10 close to the right side end edge SR of the sheet S5 is cut with the slitter 366. The cutting waste Ja generated by the slitter 366 is removed from the conveyance path 5 by one of the left and right guides 28 of the cutting waste dropping mechanism 27.

To form the cutting line D10 of the sheet S5, instead of moving the slitter 362 in the width direction W, the slitter 366 that forms the cutting line D14 of the sheet S6 is used. Thus, in the case of performing processing on the sheet S4 and the sheet S5 having different cutting positions, the sheet S5 can be processed by using the right slitter 366 of the third unit 20*c* that is the processing member 29 having the minimum moving distance in the width direction W of the slitter 36. The processing time of the sheet S4 can be shortened as compared with the case of using the right slitter 362 of the first unit 20*a*.

The process proceeds to Step 17 in FIG. 10, and i is incremented. In Step 18, it is determined whether the numerical value of i is smaller than the number of slitters 36 used in Job 2. The numerical value of i at this point is 4, and the number of slitters used in Job 2 is 4. Thus, Step 18 is not satisfied, and the process proceeds to Step 19 in FIG. 11.

In Step 19, it is determined whether the numerical value of i is larger than or equal to the number of slitters 36 used in Job 1. At this point, the numerical value of i is 4, and the number of slitters 36 used in Job 1 is 6. Thus, Step 19 is not satisfied and the process proceeds to Step 20.

In Step 20, the slitter 364 having a fifth length L15 from the reference line G in Job 1 is set to be positioned at the standby position in Job 1. Then, it is determined whether the position of the right side end edge SR of the sheet S5 conveyed on the conveyance path 5 is within a predetermined value from the processing position of the fifth slitter 364 from the reference line G of Job 1. When the length Sw of the sheet S5 in the width direction W is within the predetermined value, the length L15 from the reference line G of Job 1 to the processing position of the fifth slitter 364 is within a predetermined value. When the difference between the conveyance position of the right side end edge SR of the sheet S5 in the conveyance path 5 and the length L15 from the reference line G to the cutting line D15 of the fifth slitter 364 in Job 1 is within a predetermined value, in the processing of Job 2, a setting is made in which the fifth slitter is set to be moved to an avoidance position in a direction away from the subsequent sheet by a predetermined amount from a standby position where the sheet is caused to wait within a predetermined range from the processing position of the previously conveyed sheet, and execute an avoidance control of processing the subsequent sheet, and the fifth slitter 364 is moved to a position on the right side in the drawing longer than the length Sw in the width direction W of the sheet S5 by a predetermined amount.

The process returns to Step 21 from Step 23, and i is incremented. In Step 22, it is determined whether the numerical value of i is less than the number of slitters 36 used in Job 1. At this point, since the numerical value of i is 5 and the number of slitters used in Job 1 is 6, Step 22 is satisfied and the process proceeds to Step 23.

In Step 23, the slitter 36 forming the cutting line D16 of the sheet S6, which is the slitter 362 having the sixth length from the reference line, is set to stand by at the position in the width direction W for forming the cutting line D16 of the sheet S6 when the sheet S5 is processed. As a result, the left slitter 362 of the first unit 20*a* stands by at the standby position without performing the processing during the processing of the sheet S5. Thus, the processing time can be shortened as compared with the case of moving the slitter 362 to perform the processing.

The process returns to Step 21 from Step 23. In Step 21, i is incremented. In Step 22, it is determined whether the numerical value of i is less than the number of slitters 36 used in Job 1. At this point, the numerical value of i is 7, and the number of slitters used in Job 1 is 6, thus, Step 22 is not satisfied. In this case, the process proceeds to Step 24.

In Step 24, N is incremented. The process proceeds to Step 25 and determines whether the numerical value of N is smaller than the number of valid jobs. Since two types of jobs of Job C and Job D are executed on the sheet S4 illustrated in FIG. 16, the number of valid jobs is 2. On the other hand, since the numerical value of N is 3, Step 25 is not satisfied, and the process ends.

Third Embodiment

Figure 18:
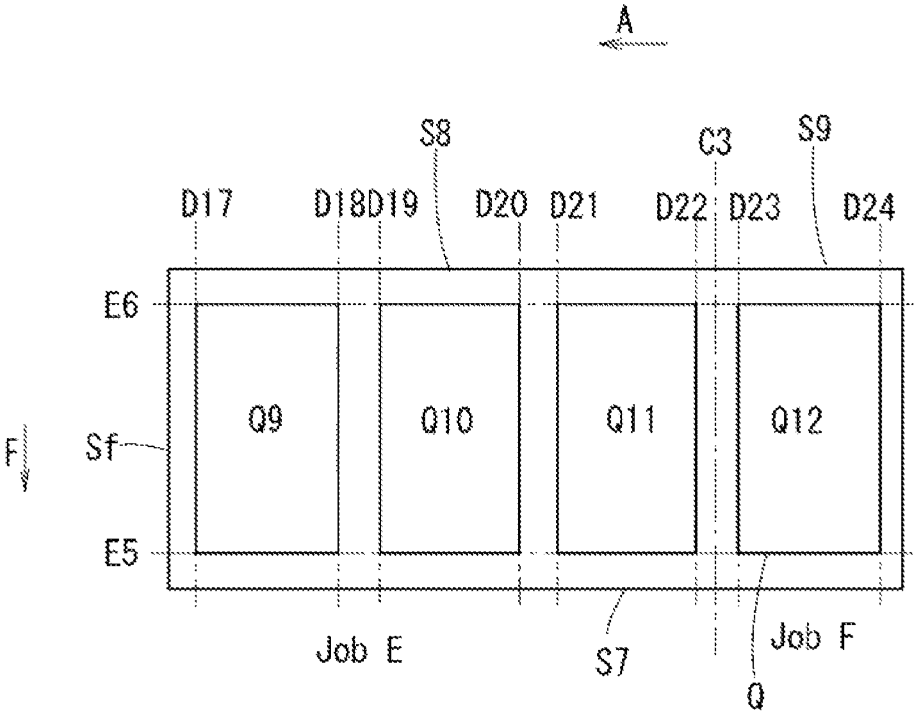
FIG. 18 is a plan view illustrating still another sheet to be processed by the apparatus for processing sheets.

FIG. 18 is a plan view illustrating a workpiece arrangement pattern of a sheet S7 according to a third embodiment. The apparatus for processing sheets 100 according to the third embodiment has the same mechanical configuration as the apparatus for processing sheets 100 according to the first embodiment. In addition, the controller 45 of the apparatus for processing sheets 100 according to the third embodiment is controlled according to the same control flow as the controller 45 according to the first embodiment.

In FIG. 18, four workpieces Q9 to Q12 without creases are produced from one sheet S7. The size and the aspect ratio of each of the four workpieces Q9 to Q12 may be the same or different.

In the cutting device 3, first, the sheet S7 conveyed in the first direction A is cut at a position C3 of ¾ in the first direction A that is the longitudinal direction of the sheet S7 from the leading end Sf of the sheet S7 in the first direction A along the second direction B orthogonal to the first direction A.

The sheet S7 is divided into two sheets of a sheet S8 and a sheet S9. The conveyance direction F of the sheets S8 and S9 is changed to the second direction B by the cross conveyor device 4, and the sheets S8 and S9 are conveyed one by one to the processing device 7 in this order. Next, the sheet S8 conveyed in the second direction B is cut along the second direction B at six cutting lines D17 to D22 parallel to the second direction B. Then, the workpieces Q9 to Q11 are obtained by sequentially cutting the sheet at the cutting lines E5 and E6 along the first direction A orthogonal to the second direction B. Thereafter, the subsequent sheet S9 is conveyed in the second direction B from the cross conveyor device 4 toward the processing device 7. The sheet S9 is cut along the second direction B at two cutting lines D23 and D24 parallel to the second direction B. Then, cutting is sequentially performed at the cutting lines E5 and E6 along the first direction A orthogonal to the second direction B.

Also when the sheet S7 according to the third embodiment is processed, like the first embodiment, which processing member 29 is moved to where in the width direction W to process the sheet S is determined according to the control flow illustrated in FIG. 5.

At this time, in Step 1 of FIG. 5, a job related to the disposition of the processing member 29 on the conveyance path 5 is constructed based on the arrangement pattern of the workpieces Q9 to Q12 on the sheet S7. In the processing illustrated in FIG. 18, since six cutting lines D17 to D22 are set for the sheet S8 conveyed ahead, and two cutting lines D23 and D24 are set for the subsequent sheet S9, the sheet S8 and the subsequent sheet S9 generate two types of Jobs E and F having different cutting positions of the slitter 36.

Figure 19:
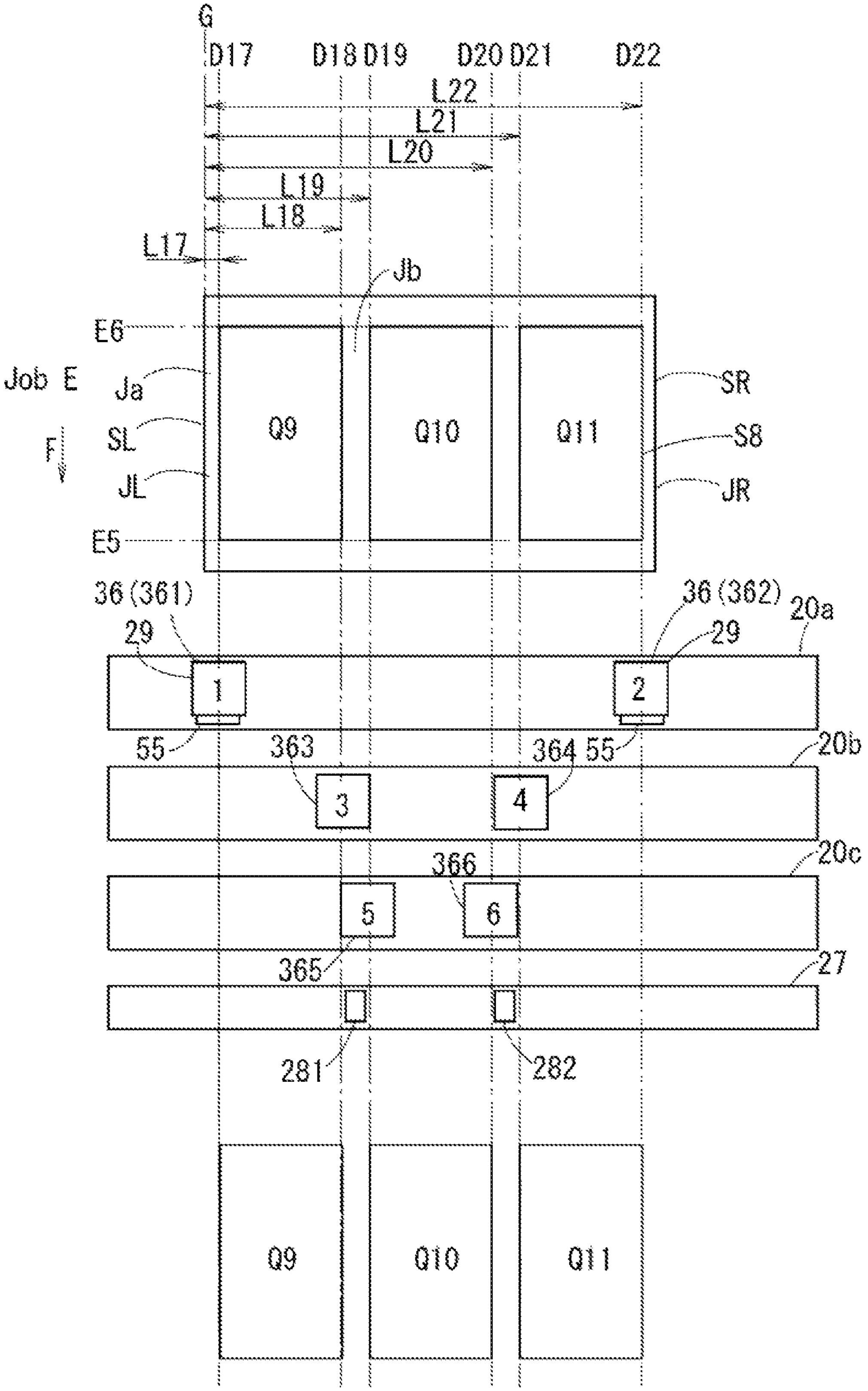
FIG. 19 is a view for explaining disposition of a processing member of the apparatus for processing sheets.

In Job E, six cutting lines 1317 to D22 along the conveyance direction are set. FIG. 19 is a diagram for explaining Job F. In Job E, six cutting lines D17 to D22 are set in the conveyance direction F of the sheet S7, which is the same as the disposition of the slitter 36 of the sheet S6 of the second embodiment.

Figure 20:
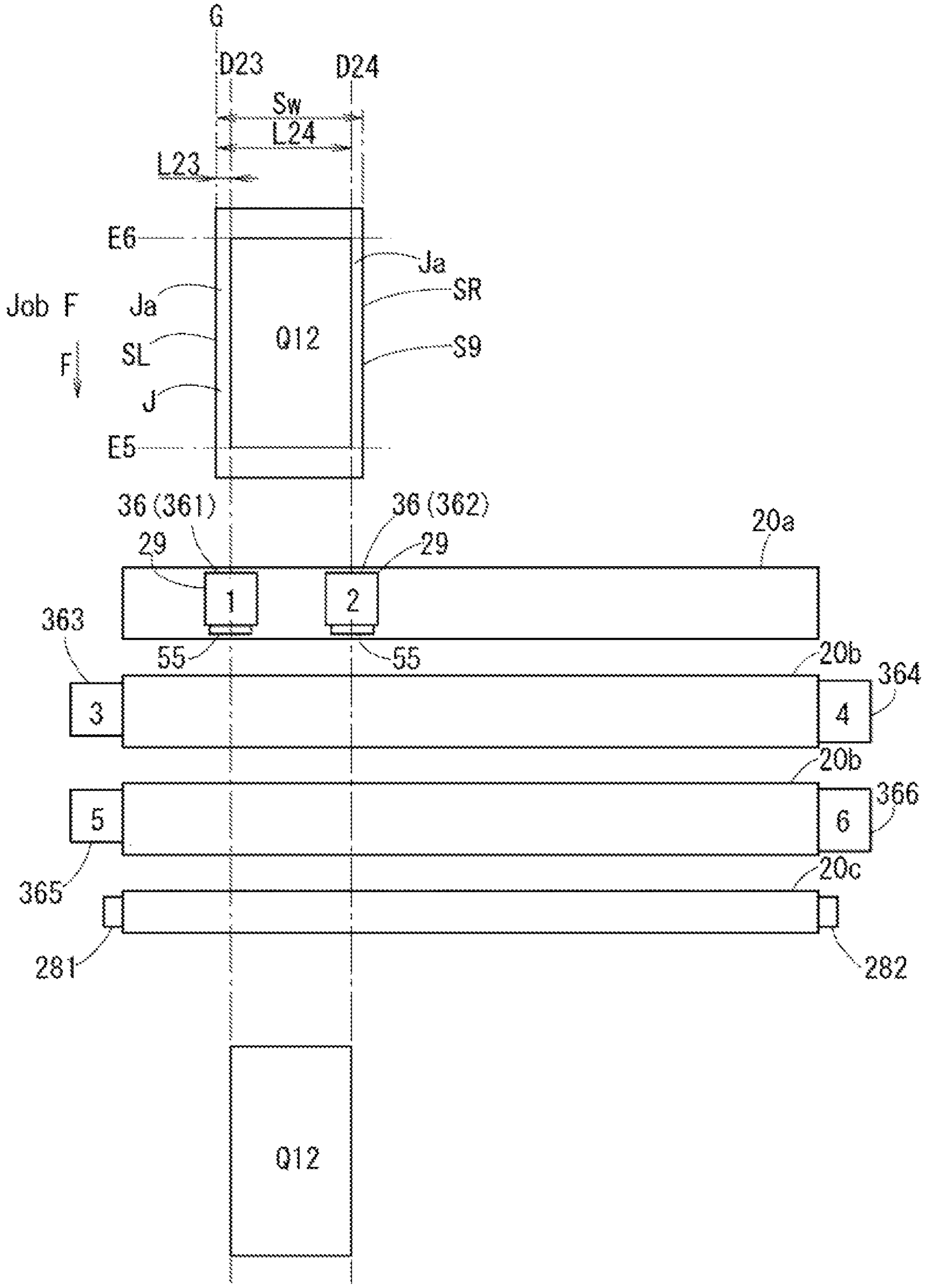
FIG. 20 is a view for explaining disposition of the processing member of the apparatus for processing sheets.
Figure 21:
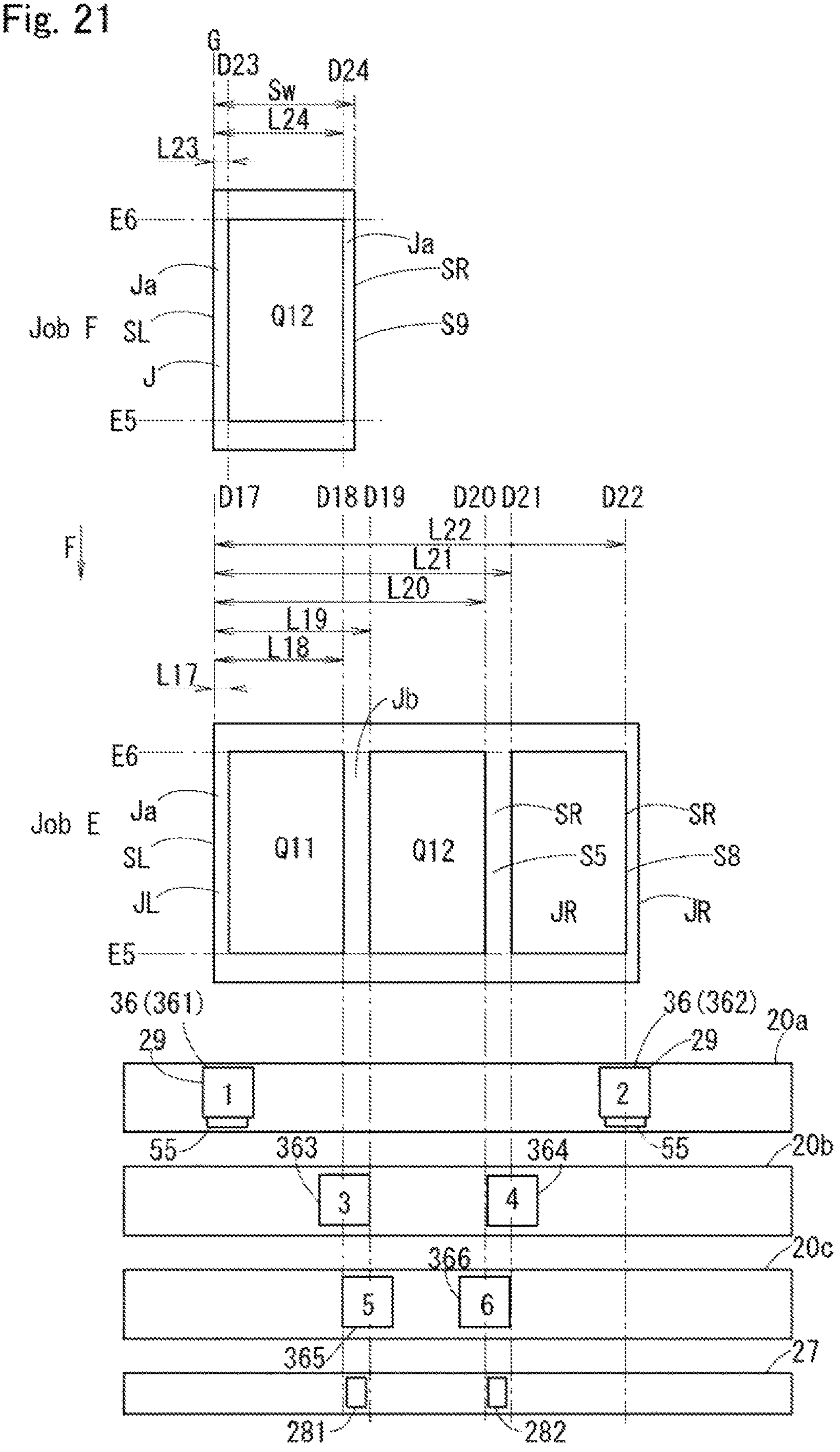
FIG. 21 is a view for explaining disposition of the processing member of the apparatus for processing sheets.

FIG. 20 is a diagram for explaining the disposition of the slitter 36 in Job F. In Job F, two cutting lines D23 and D24 are set in the conveyance direction F of the sheet S8, which is the same as the disposition of the slitter 36 of the sheet S2 of the first embodiment.

In Step 2 of FIG. 5, the constructed Jobs E and F are sorted in descending order by the number of necessary processing members 29. The number of slitters 36 used in Job E is 6. The number of slitters used in Job F is 2. In this case, when Job E and Job F are sorted in descending order, the first job is Job E, and the second job is Job F.

Job E determined as having the largest number of slitters 36 required in Step 3 is set as a reference job. This reference Job F is defined as Job 1. The other Job F is defined as Job 2.

In Step 4, it is determined whether the disposition of the processing members 29 is switchable. When it is determined in Step 4 that the processing members 29 are switchable, the processing proceeds to Step 5, and Job 1 is set as a reference job, and control is performed to switch the disposition of the processing members 29 of the other Job 2 in accordance with the disposition of Job 1. When the processing members 29 are not switchable, the process proceeds to Step 6, and the process ends without switching the disposition of the processing member 29.

In the third embodiment, when the flow switching control illustrated in FIGS. 10 and 11 is executed, the plurality of slitters 361 to 366 whose positions in the width direction W have been determined in Job 1 and Job 2 are numbered in ascending order of length from the reference line G in Step 11 of FIG. 10.

In Step 12, the job number N is set to 2. The disposition of the slitter 36 of Job E, which is set as reference Job 1, is processing along the conveyance direction F of the sheet S8 illustrated in FIG. 19. In correspondence with the disposition of the slitter 36 of Job 1 illustrated in FIG. 19, how to switch the disposition of the slitter 36 of Job F illustrated in FIG. 20 set as Job 2, is sequentially determined. In Step 13, i=0.

In Step 14, it is determined whether the identification number of the first slitter 361 of Job 2 is the same as the identification number of the first slitter 361 having the shortest length from the reference line G of Job 1.

The identification number of the first slitter 361 of Job 2 is 1, which is the same as the identification number 1 of the first slitter 361 of Job 1. In this case, since the slitter 361 having the same identification number 1 is used in both Job 1 and Job 2, there is no need to perform switching. At this time. Step 14 is satisfied, and the process proceeds to Step 17.

In Step 17, i is incremented. The process proceeds to Step 18, and it is determined whether the numerical value of i is smaller than the number of slitters 36 used in Job 2. Job 2 uses two slitters 36, and i=1, which is smaller than 2, the number of slitters of Job 2. In this case. Step 18 is satisfied, and the process returns to Step 14.

In Step 14, it is determined whether the identification number of the second slitter 36 of Job 2 illustrated in FIG. 20 is the same as the second identification number of Job 1 illustrated in FIG. 19. In Job 1, the identification number of the second slitter 36 is 3, and the identification number of Job 2 is 2. In this case, the two jobs do not satisfy Step 14, and the process proceeds to Step 15. In Step 15, it is determined whether the slitter 362 of the identification number 2 of Job 2 is switchable with the slitter 363 with the identification number 3 of Job 1.

From FIG. 20, in both the slitter 362 with the identification number 2 and the slitter 363 with the identification number 1 the lower cutting blade 36*b* is positioned on the left side and the upper cutting blade 36*a* is positioned on the right side with respect to the pressure contact part 343 of the upper and lower cutting blades 36*a* and 36*b*. In this case, the slitter 362 and the slitter 363 are switchable. Since Step 15 is satisfied, the process proceeds to Step 16.

In Step 16, the second slitter 362 of Job 2 is set to be changed from identification number 2 to the slitter 363 with identification number 3. Thus, when the cutting line D24 of the sheet S8 is made, the setting is changed so that the left slitter 363 of the second unit 20*b* is used instead of the right slitter 362 of the first unit 20*a*. As a result, when the sheet S8 and the sheet S9 are alternately conveyed to the slitter unit 20 and processed, instead of moving the right slitter 36 of the first unit 20*a* in the width direction W, the sheet S9 can be processed using the left slitter 36 of the second unit 20*b* having the minimum moving distance. Thus, the time required for moving the processing member 29 can be shortened, and the processing time of the sheet S7 can be shortened.

The process proceeds to Step 17 in FIG. 10, and i is incremented. In Step 18, it is determined whether the numerical value of i is smaller than the number of slitters 36 used in Job 2. The numerical value of i at this point is 2, and the number of slitters used in Job 2 is 2. Thus, Step 18 is not satisfied, and the process proceeds to Step 19 in FIG. 11.

In Step 19, it is determined whether the numerical value of i is larger than or equal to the number of slitters 36 used in Job 1. At this point, the numerical value of i is 2, and the number of slitters 36 used in Job 1 is 6. Thus, Step 19 is not satisfied, and the process proceeds to Step 20.

In Step 20, a comparison is made as to whether the length Sw of the sheet S9 in the width direction W is equal to or larger than a length obtained by adding a predetermined amount α to the length from the reference line of Job 1 to the processing position of the third slitter 36. When the length Sw to the third slitter 363 of Job 1 is not equal to or larger than the length obtained by adding the predetermined amount α to the length Sw in the width direction W of the sheet S9, the third slitter 363 of Job 2 is set to be moved to the avoidance position in the direction away from the length of the sheet S8 in the width direction W by the predetermined amount α.

The process proceeds to Step 21, and i is incremented. In Step 22, it is determined whether the numerical value of i is less than the number of slitters 36 used in Job 1. At this point, since the numerical value of i is 3 and the number of slitters used in Job 1 is 6, Step 22 is satisfied, and the process proceeds to Step 23.

In Step 23, the slitter 366 forming a cutting line D20 of the sheet S8, which is the fourth slitter 36 of Job 1, is set to stand by at the position in the width direction W for forming the cutting line D20 of the sheet S8 when the sheet S9 is processed. As a result, the right slitter 366 of the third unit 20*c* stands by at the standby position without performing the processing during the processing of the sheet S9. Then, when the subsequent sheet S8 is conveyed, the cutting line D20 of the sheet S8 is formed at the position in the width direction W. Thus, both the sheet S8 and the sheet S9 can be processed without moving the slitter 366. It does not take time to move the slitter 366 in the width direction W, which can shorten the processing time.

The process returns to Step 21 from Step 23. In Step 21, i is incremented. In Step 22, it is determined whether the numerical value of i is less than the number of slitters 36 used in Job 1. At this point, the numerical value of i is 4, and the number of slitters 36 used in Job 1 is 6, thus, Step 22 is satisfied. In this case, the process proceeds to Step 23.

In Step 23, like the slitter 366, the slitter 364 forming a cutting line D21 of the sheet S8, which is the fifth slitter 36 of Job 1, is set to stand by at the position in the width direction W for forming the cutting line D21 of the sheet S8 when the sheet S9 is processed.

As a result, the right slitter 364 of the second unit 20*b* stands by at the standby position without performing the processing during the processing of the sheet S9. Then, when the subsequent sheet S8 is conveyed, the cutting line D21 of the sheet S8 is formed at the position in the width direction W. Thus, both the sheet S8 and the sheet S9 can be processed without moving the slitter 364. It does not take time to move the slitter 364 in the width direction W, which can shorten the processing time.

The process returns again to Step 21 from Step 23. In Step 21, i is incremented. In Step 22, it is determined whether the numerical value of i is less than the number of slitters 36 used in Job 1. At this point, since the numerical value of i is 5 and the number of slitters 36 used in Job 1 is 6, Step 22 is satisfied, and the process proceeds to Step 23.

In Step 23, like the slitters 364 and 366, the slitter 362 forming a cutting line D22 of the sheet S8, which is the sixth slitter 36 of Job 1, is set to stand by at the position in the width direction W for forming the cutting line D22 of the sheet S8 when the sheet S9 is processed.

As a result, the right slitter 362 of the first unit 20*a* stands by at the standby position without performing the processing during the processing of the sheet S9. Then, when the subsequent sheet S8 is conveyed, the cutting line D22 of the sheet S8 is formed at the position in the width direction W. Thus, both the sheet S8 and the sheet S9 can be processed without moving the slitter 362. It does not take time to move the slitter 362 in the width direction W, which can shorten the processing time.

The process returns once again to Step 21 from Step 23. In Step 21, i is incremented. In Step 22, it is determined whether the numerical value of i is less than the number of slitters 36 used in Job 1. At this point, the numerical value of i is 6, and the number of slitters 36 used in Job 1 is 6, thus, Step 22 is not satisfied. In this case, the process proceeds to Step 24.

In Step 24, N is incremented. The process proceeds to Step 25 and determines whether the numerical value of N is smaller than the number of valid jobs. Since two types of jobs of Job E and Job F are executed on sheet S4 illustrated in FIG. 18, the number of valid jobs is 2. On the other hand, since the numerical value of N is 3, Step 25 is not satisfied, and the process ends.

In the above embodiment, the arrangement pattern of the sheets is not limited to those illustrated in the drawings, and various other patterns may be set for the number and positions of the cutting lines and the folding lines.

What is claimed is:

1. An apparatus for processing sheets comprising:

a conveyance unit that conveys a sheet;

a processing unit provided with a plurality of processing members that process the sheet along a conveyance direction of the conveyance unit, and a moving unit that moves the processing members in a width direction intersecting the conveyance direction; and a controller configured to operate the conveyance unit, the processing unit and the moving unit, wherein:

when a processing position of a sheet conveyed ahead by the conveyance unit in the width direction to be processed by the processing members is different from the processing position of a subsequent sheet, the controller controls the processing unit and the moving unit to process the subsequent sheet by using a processing member having a minimum movement distance from the processing position of the sheet conveyed ahead among the plurality of processing members, and when the processing position of a sheet conveyed further behind the subsequent sheet is within a predetermined range from the processing position of the sheet conveyed ahead, the controller executes a standby control of controlling the processing unit and the moving unit to process the subsequent sheet while causing a processing member to wait within the predetermined range from a position where the sheet conveyed ahead has been processed.

2. The apparatus for processing sheets according to claim 1, wherein when the processing position of the sheet conveyed ahead is within a predetermined value from a position of a side end edge of the subsequent sheet in a conveyance path, the controller executes an avoidance control of controlling the processing unit and the moving unit to cause the processing member positioned within the predetermined value from the side end edge of the subsequent sheet to move from a standby position within the predetermined range from the processing position of the sheet conveyed ahead to an avoidance position moved by a predetermined amount in a direction away from the subsequent sheet before processing the subsequent sheet.

3. The apparatus for processing sheets according to claim 1, wherein when the processing position of the sheet conveyed ahead is different from the processing position of the subsequent sheet, and the processing position of the sheet further behind the subsequent sheet is within a predetermined range from the processing position of the sheet conveyed ahead, the controller is operable to execute a movement control of causing the processing member, which has processed the sheet conveyed ahead, to move to the processing position of the subsequent sheet and process the subsequent sheet, and determines whether to execute the standby control or the movement control based on an instruction of a user.

4. The apparatus for processing sheets according to claim 1, comprising a cutting device that cuts the sheet along the conveyance direction on an upstream side of the processing unit.

5. An apparatus for processing sheets comprising:

a conveyance unit that conveys a sheet:

a processing unit provided with a plurality of processing members that process the sheet along a conveyance direction of the conveyance unit, and a moving unit that moves the processing members in a width direction intersecting the conveyance direction; and a controller configured to operate the conveyance unit, the processing unit and the moving unit, wherein:

when a processing position of a sheet conveyed ahead by the conveyance unit in the width direction to be processed by the processing members is different from the processing position of a subsequent sheet, the controller controls the processing unit and the moving unit to process the subsequent sheet by using a processing member having a minimum movement distance from the processing position of the sheet conveyed ahead among the plurality of processing members, and when the processing position of the sheet conveyed ahead is different from the processing position of the subsequent sheet, and the processing position of the sheet further behind the subsequent sheet is within a predetermined range from the processing position of the sheet conveyed ahead, the controller is operable to execute a movement control of causing the processing member, which has processed the sheet conveyed ahead, to move to the processing position of the subsequent sheet and process the subsequent sheet, and determines whether to execute the standby control or the movement control based on an instruction of a user.

6. An apparatus for processing sheets comprising:

a conveyance unit that conveys a sheet;

a processing unit provided with a plurality of processing members that process the sheet along a conveyance direction of the conveyance unit, and a moving unit that moves the processing members in a width direction intersecting the conveyance direction; and a controller configured to operate the conveyance unit, the processing unit and the moving unit, wherein:

when a processing position of a sheet conveyed ahead by the conveyance unit in the width direction to be processed by the processing members is different from the processing position of a subsequent sheet, the controller controls the processing unit and the moving unit to process the subsequent sheet by using a processing member having a minimum movement distance from the processing position of the sheet conveyed ahead among the plurality of processing members, and further comprising:

a slitter unit provided with a slitter that cuts the sheet along the conveyance direction of the conveyance unit and a slitter moving unit that moves the slitter in the width direction; and a guide that removes cutting waste generated by cutting the sheet by the slitter from a conveyance path and a guide moving unit that moves the guide in the width direction are provided, and wherein the controller is configured to operate the slitter unit, and the controller controls the guide moving unit to remove cutting waste generated at a side end of the sheet, the waste being generated by cutting the sheet with the slitter, from the conveyance path by the guide.

7. The apparatus for processing sheets according to claim 6, comprising a cutting device that cuts the sheet along the conveyance direction on an upstream side of the processing unit.

* * * * *